US012759061B2

(12) United States Patent
Eto et al.

(10) Patent No.: US 12,759,061 B2
(45) Date of Patent: Oct. 13, 2026

(54) MACHINING SYSTEM AND MACHINING APPARATUS, MACHINING METHOD, AND MACHINING PROGRAM

(71) Applicants: MITSUBISHI HEAVY INDUSTRIES, LTD., Tokyo (JP); aT ROBOTICS inc., Tokyo (JP)

(72) Inventors: Jun Eto, Tokyo (JP); Shinji Kozuma, Tokyo (JP); Tsukasa Takenaka, Tokyo (JP)

(73) Assignees: MITSUBISHI HEAVY INDUSTRIES, LTD., Tokyo (JP); AT ROBOTICS INC., Tokyo (JP)

( * ) Notice: Subject to any disclaimer, the term of this patent is extended or adjusted under 35 U.S.C. 154(b) by 933 days.

(21) Appl. No.: 18/056,314

(22) Filed: Nov. 17, 2022

(65) Prior Publication Data

US 2023/0158581 A1 May 25, 2023

(30) Foreign Application Priority Data

Nov. 19, 2021 (JP) ................................ 2021-188661

(51) Int. Cl.
*B23C 1/10* (2006.01)

(52) U.S. Cl.
CPC ..................................... *B23C 1/10* (2013.01)

(58) Field of Classification Search
CPC ... B23C 1/10; B23C 2215/04; B23C 2220/04; B23C 3/002; B23C 3/16; B23C 5/10; B23C 5/1009; G05B 19/4093
See application file for complete search history.

(56) References Cited

U.S. PATENT DOCUMENTS 4,850,761 A 7/1989 Breuer et al.
2004/0048548 A1* 3/2004 Shepherd ............... B24C 1/045 451/2

(Continued)

FOREIGN PATENT DOCUMENTS

JP S63102820 A 5/1988
JP 63256809 A 10/1988

(Continued)

OTHER PUBLICATIONS

Notice of Reasons for Refusal, Japanese Patent Application No. 2021-188661, dated Jan. 30, 2024, 6pp.

(Continued)

*Primary Examiner* — Vincent H Tran
(74) *Attorney, Agent, or Firm* — HAUPTMAN HAM, LLP

(57) ABSTRACT

Provided are a machining system and a machining apparatus, a machining method, and a machining program that can improve machining precision. The machining system includes: a machining path setting unit that sets first and second machining paths based on a three-dimensional shape of a measured target component; and a movement control unit that moves an end mill along the first and second machining paths. The movement control unit includes a feed direction control unit that moves the end mill in a feed direction in which the end mill is moved along the first and second machining paths, an orthogonal direction control unit that moves the end mill in a direction orthogonal to the feed direction, and a tilt control unit that controls a tilt angle of the end mill about an axis of the feed direction.

2 Claims, 27 Drawing Sheets

(56) References Cited

U.S. PATENT DOCUMENTS

| | | | | |
|---|---|---|---|---|
| 2007/0251072 | A1 | 11/2007 | Beeson et al. | |
| 2009/0144980 | A1 | 6/2009 | Rangarajan et al. | |
| 2012/0197424 | A1* | 8/2012 | Kimura | G05B 19/184 700/103 |
| 2014/0041183 | A1 | 2/2014 | Rangarajan et al. | |
| 2014/0061167 | A1 | 3/2014 | Stecker et al. | |
| 2014/0137409 | A1 | 5/2014 | Louesdon et al. | |
| 2014/0182131 | A1 | 7/2014 | Mereaux et al. | |
| 2014/0257551 | A1 | 9/2014 | Junod et al. | |
| 2015/0081074 | A1 | 3/2015 | Louesdon et al. | |
| 2015/0283654 | A1 | 10/2015 | Ernst et al. | |
| 2016/0039014 | A1* | 2/2016 | Uenishi | B23C 1/14 700/192 |
| 2016/0207141 | A1 | 7/2016 | Conseil | |
| 2016/0346892 | A1 | 12/2016 | Bhapkar et al. | |
| 2017/0038760 | A1 | 2/2017 | Compagnat et al. | |
| 2017/0113324 | A1 | 4/2017 | Romanoff et al. | |
| 2021/0009250 | A1 | 1/2021 | Yamada et al. | |
| 2021/0162519 | A1* | 6/2021 | Kwon | B23C 3/18 |
| 2022/0334549 | A1* | 10/2022 | Tsuchiya | B23Q 15/12 |
| 2023/0056743 | A1* | 2/2023 | Koch | G05B 19/41 |

FOREIGN PATENT DOCUMENTS

| | | | | |
|---|---|---|---|---|
| JP | 06214633 | A | | 8/1994 |
| JP | H08190416 | A | | 7/1996 |
| JP | H10-80817 | A | | 3/1998 |
| JP | 10151547 | A | | 6/1998 |
| JP | 2002157007 | A | | 5/2002 |
| JP | 2006068901 | A | | 3/2006 |
| JP | 2011083842 | A | * | 4/2011 |
| JP | 2013082064 | A | | 5/2013 |
| JP | 2013167935 | A | | 8/2013 |
| JP | 5451049 | B2 | | 3/2014 |
| JP | 2016137522 | A | | 8/2016 |
| JP | 2017037640 | A | | 2/2017 |
| JP | 2018008323 | A | * | 1/2018 |
| JP | 2018538150 | A | | 12/2018 |
| JP | 2019206065 | A | | 12/2019 |

OTHER PUBLICATIONS

Office Action for Japanese Application No. 2021-188661 dated Sep. 19, 2023—7 pp.

* cited by examiner

MACHINING SYSTEM AND MACHINING APPARATUS, MACHINING METHOD, AND MACHINING PROGRAM

CROSS-REFERENCE TO RELATED APPLICATIONS

This application claims the benefit of priority to Japanese Patent Application Number 2021-188661 filed on Nov. 19, 2021. The entire contents of the above-identified application are hereby incorporated by reference.

BACKGROUND

1. Technical Field

The present disclosure relates to a machining system and a machining apparatus, a machining method, and a machining program.

2. Description of Related Art

Aircraft components such as a fuselage or a main wing of an aircraft are formed of structure members such as a long sheet frame. A sheet frame is bent and molded from a plate-like member so that the cross section thereof in the longitudinal direction has a desired cross-sectional shape for the purpose of improving the strength or the like. Since a fuselage, a main wing, and the like to which a sheet frame is applied each have a curved surface shape, the sheet frame is molded to have a curved shape curved in the longitudinal direction. The sheet frame has a complex surface shape.

Machining to thin the plate thickness (hereafter, also referred to as "plate thinning machining") may be performed on a sheet frame used for an aircraft for the purpose of weight reduction or the like (for example, Japanese Patent Application Laid-Open No. 2019-206065).

Conventionally, chemical milling is used for plate thinning machining on a structure component having a complex surface shape. Chemical milling is a machining method to remove metal by chemical edging using alkaline or acid. Such chemical milling is used to thin the structure component evenly, and thereby a weight reduction of a structure component is realized.

Japanese Patent Application Laid-Open No. 2019-206065 is an example of the related art.

In chemical milling, there is a concern about an environmental load caused by use of a chemical substance. Thus, chemical-free machining is desired.

In particular, for a molded component of a sheet metal, a molded component of a composite material, or the like, the shape after molded may have a large error with respect to a CAD design model. When machining is performed based on CAD data, excessive cutting or insufficient cutting may occur.

In z-coordinate offset correction, an end mill is controlled on three axes of a feed direction, a pitch direction, and a center axis direction (z-coordinate) to perform machining, and a level difference (mismatch) is likely to occur in a machined surface. Thus, improvement in the machining precision of a machined surface is desired.

BRIEF SUMMARY

The present disclosure has been made in view of such circumstances and intends to provide a machining system and a machining apparatus, a machining method, and a machining program that can improve machining precision.

The first aspect of the present disclosure is a machining system including: a machining path setting unit configured to set a machining path based on a three-dimensional shape of a measured target component; and a movement control unit configured to move an end mill along the machining path, and the movement control unit includes a feed direction control unit configured to move the end mill in a feed direction in which the end mill is moved along the machining path, an orthogonal direction control unit configured to move the end mill in an orthogonal direction orthogonal to the feed direction, and a tilt control unit configured to control a tilt angle of the end mill about an axis of the feed direction.

The second aspect of the present disclosure is a machining method including: a machining path setting step of setting a machining path based on a three-dimensional shape of a measured target component; and a movement control step of moving an end mill along the machining path, and the movement control step includes a feed direction control step of moving the end mill in a feed direction in which the end mill is moved along the machining path, an orthogonal direction control step of moving the end mill in an orthogonal direction orthogonal to the feed direction, and a tilt control step of controlling a tilt angle of the end mill about an axis of the feed direction.

The third aspect of the present disclosure is a machining program configured to cause a computer to perform: a machining path setting process of setting a machining path based on a three-dimensional shape of a measured target component; and a movement control process of moving an end mill along the machining path, and the movement control process includes a feed direction control process of moving the end mill in a feed direction in which the end mill is moved along the machining path, an orthogonal direction control process of moving the end mill in an orthogonal direction orthogonal to the feed direction, and a tilt control process of controlling a tilt angle of the end mill about an axis of the feed direction.

According to the present disclosure, an advantageous effect of being able to improve machining precision is achieved.

DETAILED DESCRIPTION

One embodiment of a machining system and a machining apparatus, a machining method, and a machining program according to the present disclosure will be described below with reference to the drawings.

Machining Target Material

A workpiece (a machining target material) 10 on which machining is performed by the machining method according to the present embodiment will be described.

Figure 1:
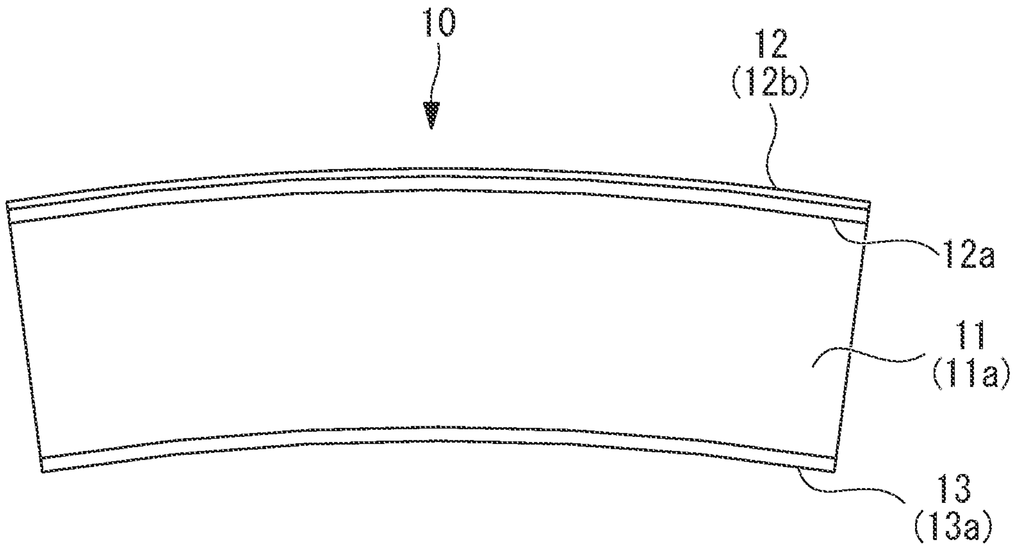
FIG. 1 is a plan view of a workpiece according to one embodiment of the present disclosure.

FIG. 1 illustrates a plan view of the workpiece 10.

Figure 2:
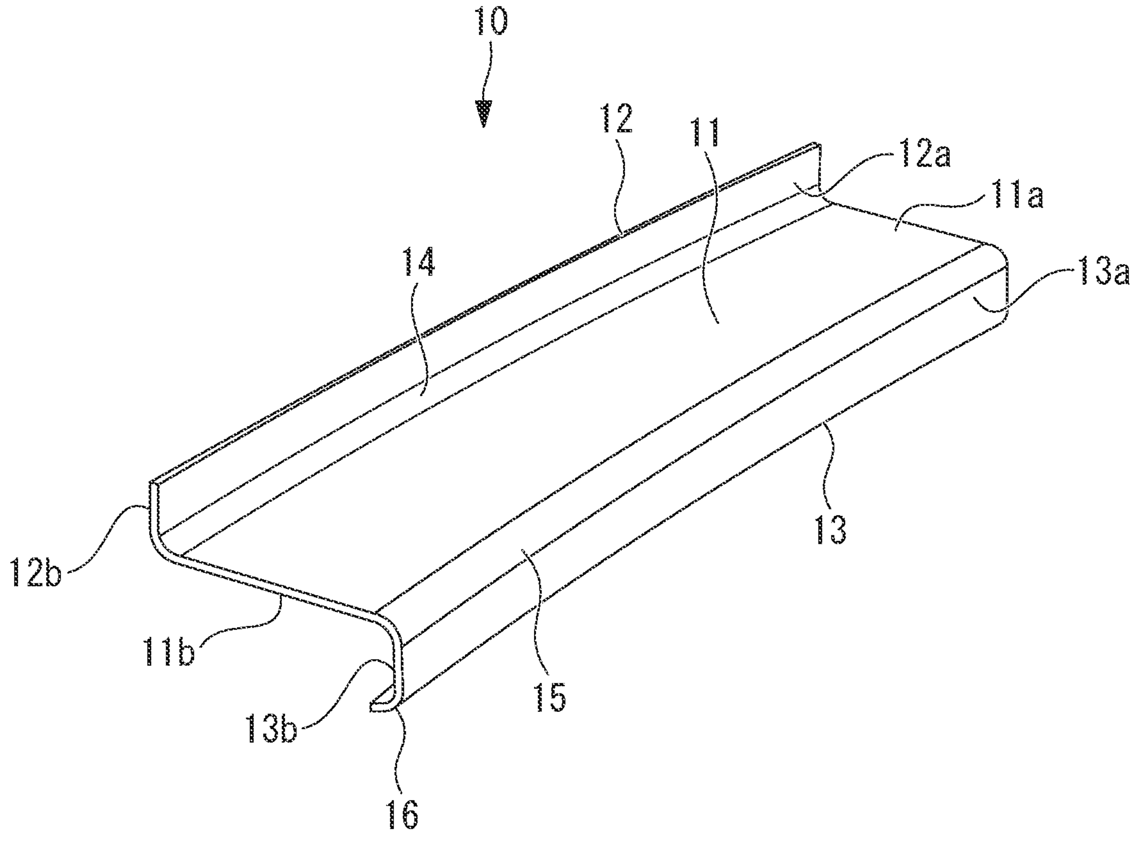
FIG. 2 is a top perspective view of the workpiece according to one embodiment of the present disclosure.

FIG. 2 illustrates a top perspective view of the workpiece 10.

The workpiece 10 is a sheet frame used as a structure component such as a fuselage or a main wing of an aircraft, for example. The workpiece 10 is made of a metal, for example.

An example of the metal may be an aluminum alloy (for example, 7000-series aluminum alloys or 2000-series aluminum alloys) or a titanium alloy (for example, 6-4Ti).

The workpiece 10 is a long member having a web part 11, an upper flange part 12 (also simply referred to as "flange part 12"), and a lower flange part 13 (also simply referred to as "flange part 13").

The web part 11 and the upper flange part 12 are connected to each other via an R-part 14. Further, the web part 11 and the lower flange part 13 are connected to each other via an R-part 15. Further, an R-part 16 is formed to the lower end (edge) of the lower flange part 13.

The workpiece 10 has a plan-view shape that is substantially an arc shape including the upper flange part 12 and the lower flange part 13 and has a cross-sectional shape that is substantially a Z-shape. The length dimension along the arc direction of the workpiece 10 in plan view is about 6 m, for example.

Respective parts forming the workpiece 10 will be described below.

The web part 11 is a plate-like portion forming substantially an arc shape in plan view.

The width dimension (the dimension in the radial direction) of the web part 11 is substantially constant in the circumferential direction.

The thickness dimension (the plate thickness) of the web part 11 is about 0.05 inches to 0.15 inches (1.27 mm to 3.81 mm) before machining described later is performed.

The upper flange part 12 is connected to the outer circumferential edge of the two edges along the arc shape of the web part 11 and has a plate-like portion bent from the edge and arranged perpendicularly upward. The upper flange part 12 is connected to the web part 11 via the round part (R-part) 14 that is smoothly curved.

The height dimension (the dimension in the perpendicular arrangement direction) of the upper flange part 12 is substantially constant in the circumferential direction.

The thickness dimension (the plate thickness) of the upper flange part 12 is about 0.05 inches to 0.15 inches (1.27 mm to 3.81 mm) before machining described later is performed.

The lower flange part 13 is connected to the inner circumferential edge of the two edges along the arc shape of the web part 11 and has a plate-like portion bent from the edge and arranged perpendicularly downward. The lower flange part 13 is connected to the web part 11 via the round part (R-part) 15 that is smoothly curved. Further, the round part (R-part) 16 smoothly curved circumferentially outward in the arc shape of the web part 11 is formed to the lower end (edge) of the lower flange part 13.

The height dimension (the dimension in the perpendicular arrangement direction) of the lower flange part 13 is substantially constant in the circumferential direction.

The thickness dimension (the plate thickness) of the lower flange part 13 is about 0.05 inches to 0.15 inches (1.27 mm to 3.81 mm) before machining described later is performed.

Jig

A jig 20 to which the workpiece 10 is attached when the machining method according to the present embodiment is performed will be described.

The jig 20 is a device for securing the workpiece 10 in a suitable position in a suitable state in order to suitably perform machining described later on the workpiece 10.

Figure 3:
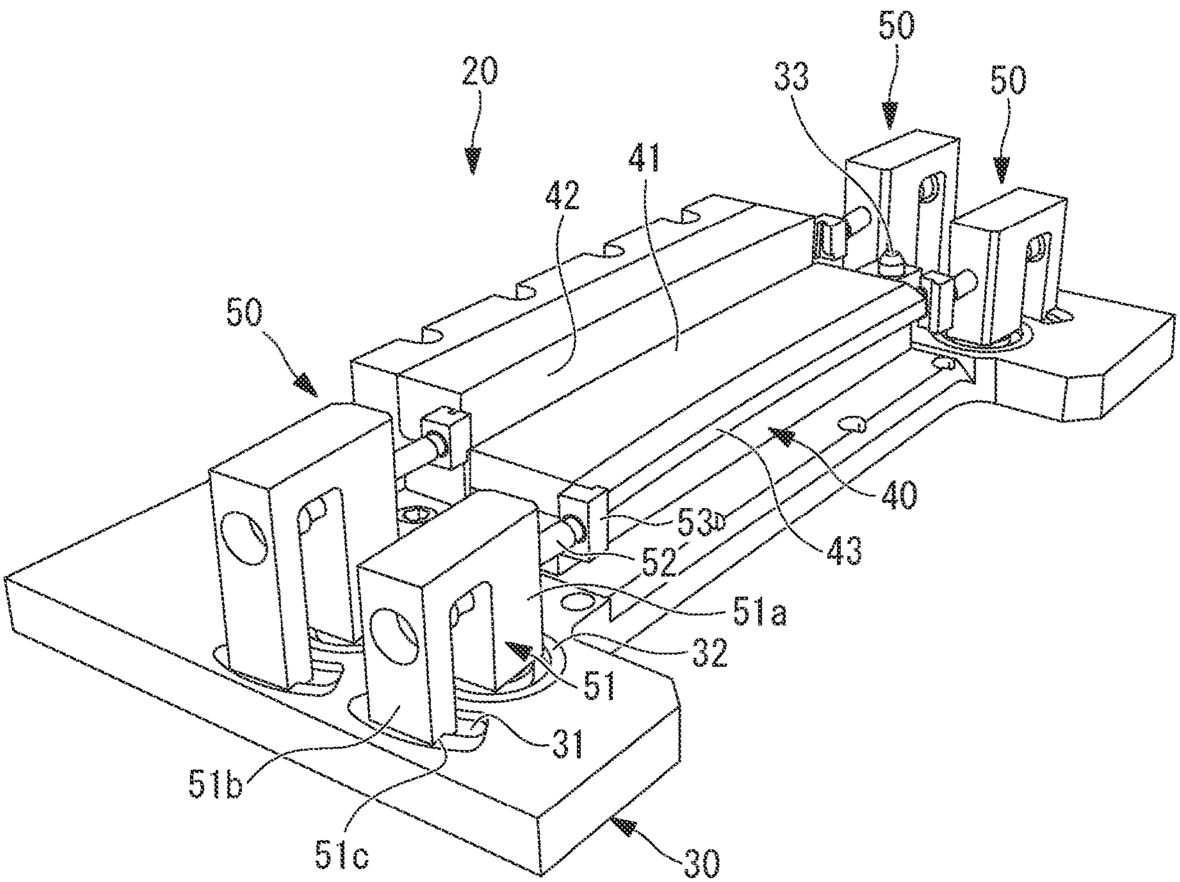
FIG. 3 is a top perspective view of a jig according to one embodiment of the present disclosure.
Figure 4:
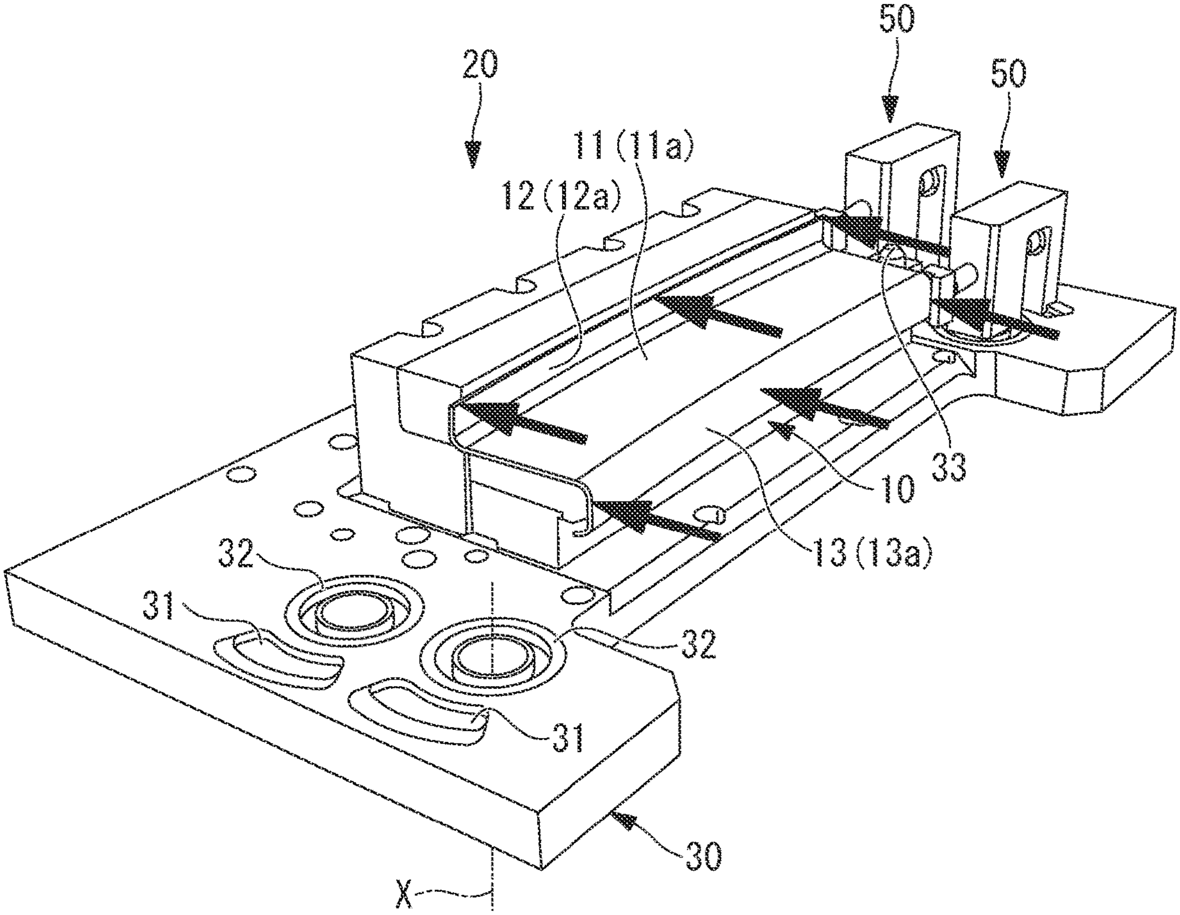
FIG. 4 is a top perspective view of the jig according to one embodiment of the present disclosure (clamps are omitted).
Figure 5:
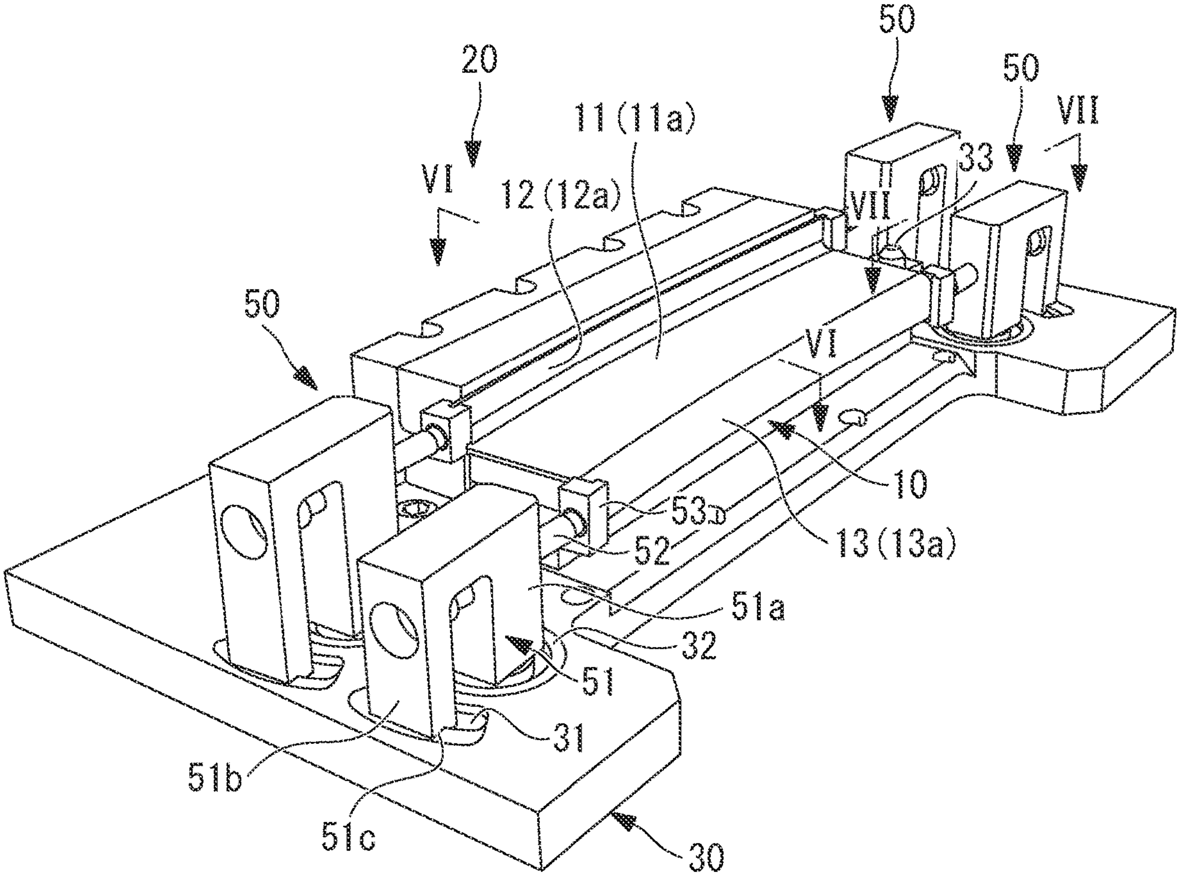
FIG. 5 is a top perspective view of a state where the workpiece is set in the jig according to one embodiment of the present disclosure.
Figure 6:
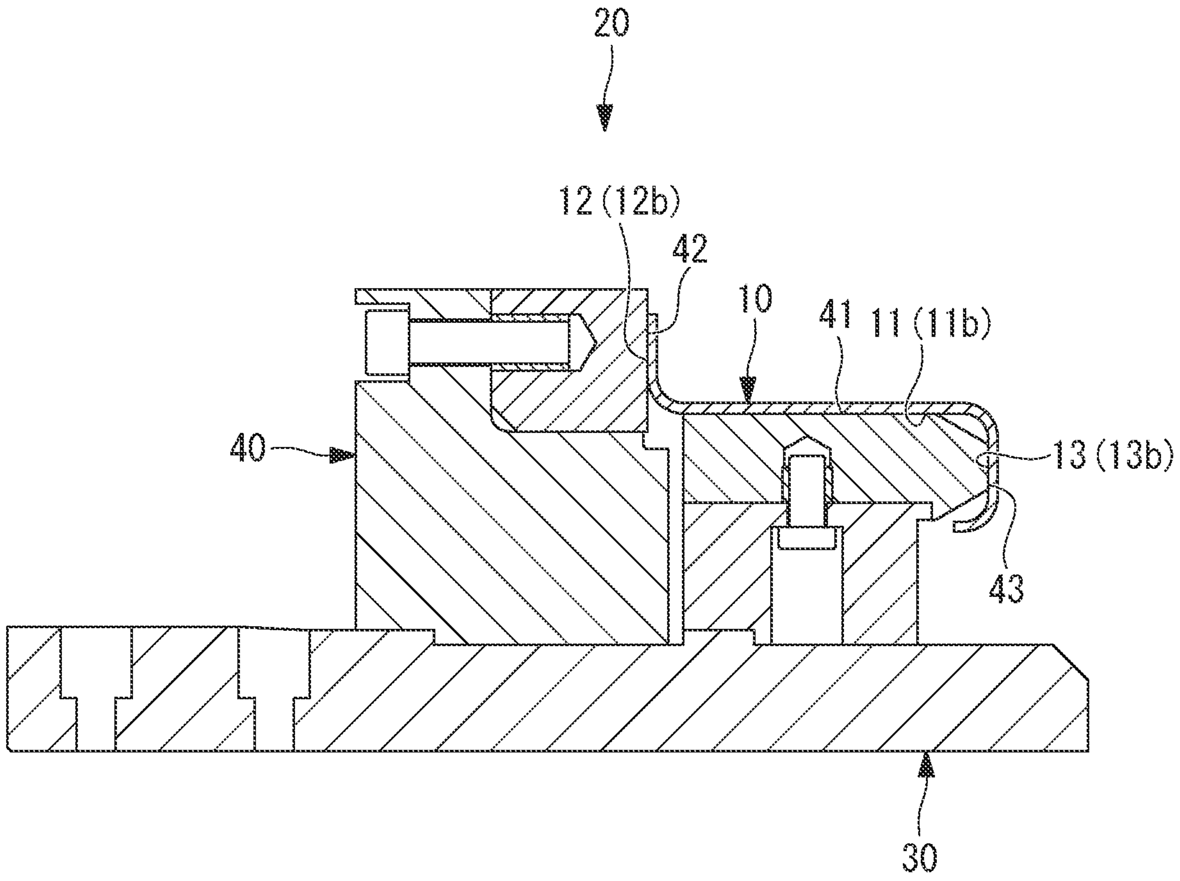
FIG. 6 is a cross-sectional view taken along a cut line VI-VI illustrated in FIG. 5.
Figure 7:
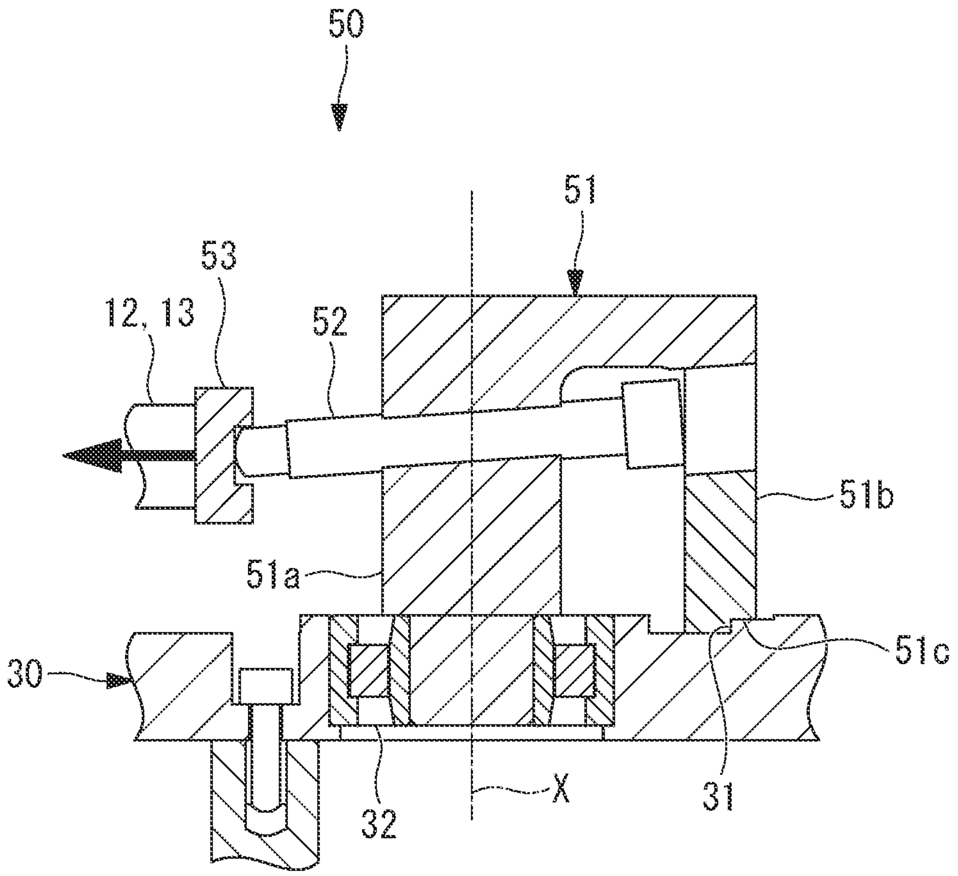
FIG. 7 is a cross-sectional view taken along a cut line VII-VII illustrated in FIG. 5.

FIG. 3 illustrates a top perspective view of the jig 20. FIG. 4 and FIG. 5 illustrate the top perspective views of the jig 20 in a state where the workpiece 10 is placed. FIG. 6 illustrates a sectional view taken along the cut line VI-VI illustrated in FIG. 5. FIG. 7 illustrates a sectional view taken along the cut line VII-VII illustrated in FIG. 5.

Note that, in FIG. 4, some of the clamps 50 are omitted for simplified illustration.

As illustrated in FIG. 3, the jig 20 has a base 30, a setting block 40, and four clamps 50.

The base 30 is a plate-like member having a predetermined thickness dimension.

The thickness dimension of the base 30 is set at a dimension that exhibits rigidity sufficient to be bearable against a loading occurring when the workpiece 10 is fixed.

As illustrated in FIG. 3 to FIG. 6, the setting block 40 is a component arranged on the top face of the base 30 and fixed to the base 30 and is a portion to which the workpiece 10 is set.

The setting block 40 has a supporting surface 41, an upper flange contacting surface 42 (also simply referred to as "contacting surface 42"), and a lower flange contacting surface 43 (also simply referred to as "contacting surface 43").

The supporting surface 41 is a surface on which the web part 11 of the workpiece 10 is placed. Specifically, the supporting surface 41 is a surface that, when the workpiece 10 is placed thereon, comes into contact with a supported surface 11*b* that is the backside of a machined surface 11*a* of the web part 11.

The supporting surface 41 has substantially an arc shape as with the web part 11 in plan view.

The upper flange contacting surface 42 is a surface with which the upper flange part 12 of the workpiece 10 comes into contact. Specifically, the upper flange contacting surface 42 is a surface that, when the workpiece 10 is placed thereon, comes into contact with a contacted surface 12*b* that is the backside of a machined surface 12*a* of the upper flange part 12.

The upper flange contacting surface 42 is a surface extending perpendicularly upward with respect to the supporting surface 41.

The lower flange contacting surface 43 is a surface with which the lower flange part 13 of the workpiece 10 comes into contact. Specifically, the lower flange contacting surface 43 is a surface that, when the workpiece 10 is placed thereon, comes into contact with a contacted surface 13*b* that is the backside of a machined surface 13*a* of the lower flange part 13.

The lower flange contacting surface 43 is a surface extending perpendicularly downward with respect to the supporting surface 41.

Note that, while each shape of the contacted surface 12*b*, the supported surface 11*b*, and the contacted surface 13*b* of the workpiece 10 substantially matches each shape of the upper flange contacting surface 42, the supporting surface 41, and the lower flange contacting surface 43 of the setting block 40 (substantially a Z-shape), it is apparent that what serves as a reference for the shape is each surface formed in the setting block 40 that has higher rigidity than the workpiece 10.

As illustrated in FIG. 3 to FIG. 5 and FIG. 7, each clamp 50 is a component arranged on the top surface of the base 30 and fixed rotatably to the base 30 and has a function of pressing the contacted surface 12*b* and the contacted surface 13*b* of the workpiece 10 against the upper flange contacting surface 42 and the lower flange contacting surface 43 of the setting block 40.

Respective clamps 50 are arranged near positions corresponding to four corners of the workpiece 10 set on the setting block 40.

Each clamp 50 has a clamp body 51, a load bolt 52, and a load block 53.

The clamp body 51 is substantially an inverse U-shaped component having a rotating part 51*a* and a leg part 51*b*.

The rotating part 51*a* is a portion fitted to an inner wheel of a bearing 32 provided on the base 30 and implements rotation of the clamp 50 together with the bearing 32. Note that the rotation axis X of the clamp 50 (that is, the rotation axis X of the rotating part 51*a*) is orthogonal to the top surface of the base 30.

The leg part 51*b* is a portion that slidably engages with a base-side step 31 formed in the base 30 and thereby bears against a load working on the clamp 50.

Specifically, as illustrated in FIG. 7, the base-side step 31 formed so as to be recessed from the top surface of the base 30 and a clamp-side step 51*c* corresponding to the shape of the base-side step 31 are engaged with each other, and thereby the leg part 51*b* bears against a load working on the clamp 50 (a load due to a reaction received from the load bolt 52 described later).

Note that, as illustrated in FIG. 4, the base-side step 31 and the clamp-side step 51*c* are formed in an arc shape about the rotation axis X of the clamp 50. Thus, the base-side step 31 and the clamp-side step 51*c* slide smoothly without preventing the rotation of the clamp 50.

As illustrated in FIG. 3 to FIG. 5 and FIG. 7, the load bolt 52 is a bolt screwed into the rotating part 51*a* of the clamp body 51.

The load bolt 52 is provided in the rotating part 51*a* with the tip on the workpiece 10 side being inclined downward.

The load block 53 is a component connected to the tip of the load bolt 52.

The load block 53 is connected so as to rotate three-dimensionally to the tip of the load bolt 52. This is realized by the tip of the load bolt 52 being formed in a spherical shape, for example.

The workpiece 10 is attached as follows to the jig 20 configured as described above.

As illustrated in FIG. 4 and FIG. 5, first, the workpiece 10 is set to the setting block 40. At this time, the workpiece 10 is positioned by causing the end surface of the workpiece 10 to come into contact with a positioning pin 33 erected from the base 30.

Accordingly, the contacted surface 12*b*, the supported surface 11*b*, and the contacted surface 13*b* of the workpiece 10 come into contact with the upper flange contacting surface 42, the supporting surface 41, and the lower flange contacting surface 43 of the setting block 40.

Next, the load bolt 52 is rotated about the axis and pressed in the axis direction to press the load blocks 53 against the end surface of the workpiece 10. In detail, the load block 53 is slightly pressed against the end surface of the upper flange part 12 (two portions in the arc direction) and the end surface of the lower flange part 13 (two portions in the arc direction).

At this time, since the load block 53 is configured to rotate three-dimensionally with respect to the tip of the load bolt 52, the load block 53 is pressed perpendicularly against the end surface of the upper flange part 12 and the end surface of the lower flange part 13. Accordingly, the load from the load bolt 52 can be input in the tangential direction of the arc.

Further, since the load bolt 52 is inclined downward, the web part 11 of the workpiece 10 is pressed against the setting block 40.

Next, the load bolt 52 is further pushed in to press the end surface of the upper flange part 12 and the end surface of the lower flange part 13 with predetermined force. Herein, the predetermined force is force of 30 kN to 70 kN per one load bolt 52 (fastening torque of 100 Nm to 190 Nm) when a bolt of M16 is used as the load bolt 52, for example.

Figure 8:
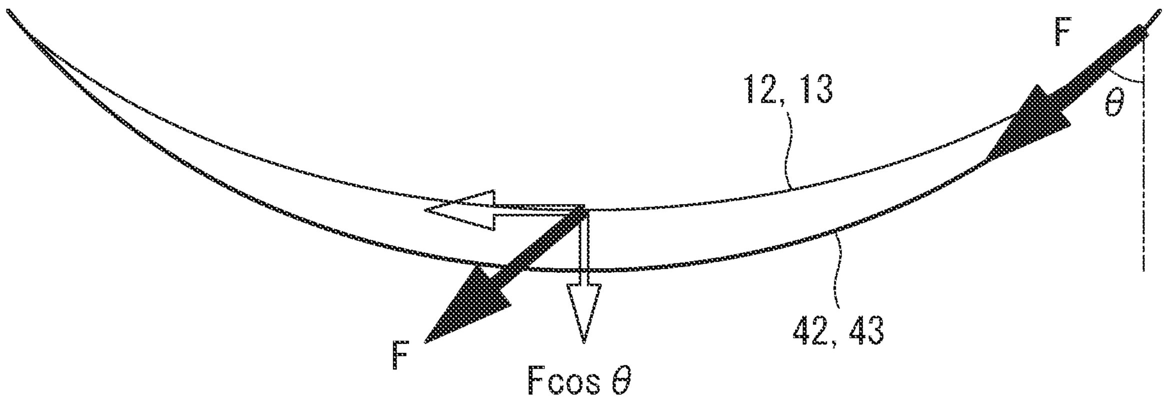
FIG. 8 is a diagram illustrating a concept of a tangential load method.

At this time, as illustrated in FIG. 8, the upper flange part 12 and the lower flange part 13 are naturally pressed against the upper flange contacting surface 42 and the lower flange contacting surface 43 by a force component ($F\cos\theta$), which is directed to the upper flange contacting surface 42 side and the lower flange contacting surface 43 side, of the load F working in the tangential direction (this is called "tangential load method" (see Japanese Patent Application Laid-Open No. 2019-141981)).

Accordingly, it is possible to cause the contacted surface 12*b* of the upper flange part 12 to be in close contact with the upper flange contacting surface 42 of the setting block 40 and cause the contacted surface 13*b* of the lower flange part 13 to be in close contact with the lower flange contacting surface 43 of the setting block 40 by using the shaft force of the load bolt 52.

Further, it is possible to finely control the shaft force by adjusting the fastening torque of the load bolt 52.

Once the contacted surface 12*b* of the upper flange part 12 is in close contact with the upper flange contacting surface 42 and the contacted surface 13*b* of the lower flange part 13 is in close contact with the lower flange contacting surface 43, distortion in the upper flange part 12 and the lower flange part 13 is reformed. On the other hand, the reformed distortion is aggregated into the web part 11.

Thus, this method reforms the distortion in the upper flange part 12 and the lower flange part 13 and intentionally aggregates the distortion of the workpiece 10 into the web part 11.

When the distortion is aggregated into the web part 11, the supported surface 11*b* of the web part 11 separates from and rises above the supporting surface 41 of the setting block 40.

Figure 9:
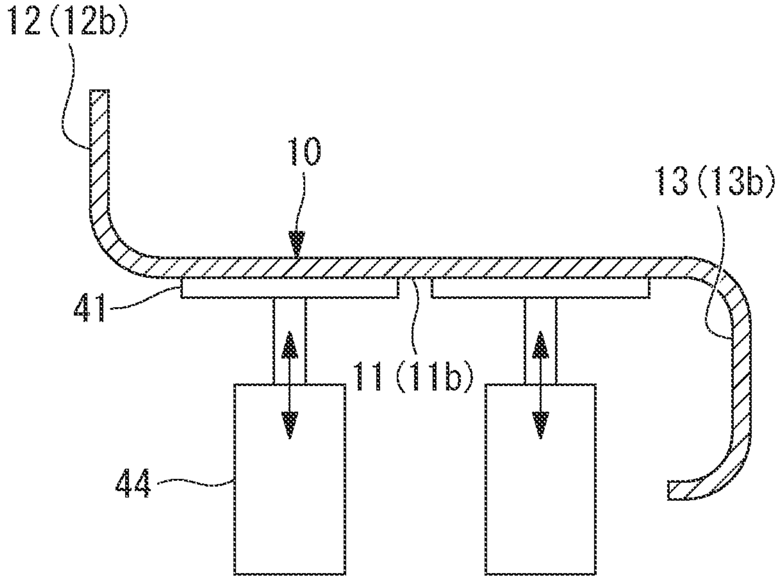
FIG. 9 is a cross-sectional view illustrating a supporting surface of the jig according to one embodiment of the present disclosure.

Accordingly, to suitably support the web part 11 (supported surface 11*b*) even after separation and rising, a lifting mechanism 44 (for example, an air cylinder) as illustrated in FIG. 9 may be used to cause the supporting surface 41 to follow the supported surface 11*b*.

Note that, in pushing the load bolt 52, the upper flange part 12 and the lower flange part 13 may be pushed to the upper flange contacting surface 42 side and the lower flange contacting surface 43 side by some device (not illustrated) as illustrated in FIG. 4 so that the upper flange part 12 and the lower flange part 13 are reliably guided to the upper flange contacting surface 42 side and the lower flange contacting surface 43 side.

The portions to be pushed can be three portions of both ends and the center of the upper flange part 12 and three portions of both ends and the center of the lower flange part 13 regardless of the length of the workpiece 10.

Note that, after the workpiece 10 is attached to the jig 20, the pushing action is released.

Figure 10:
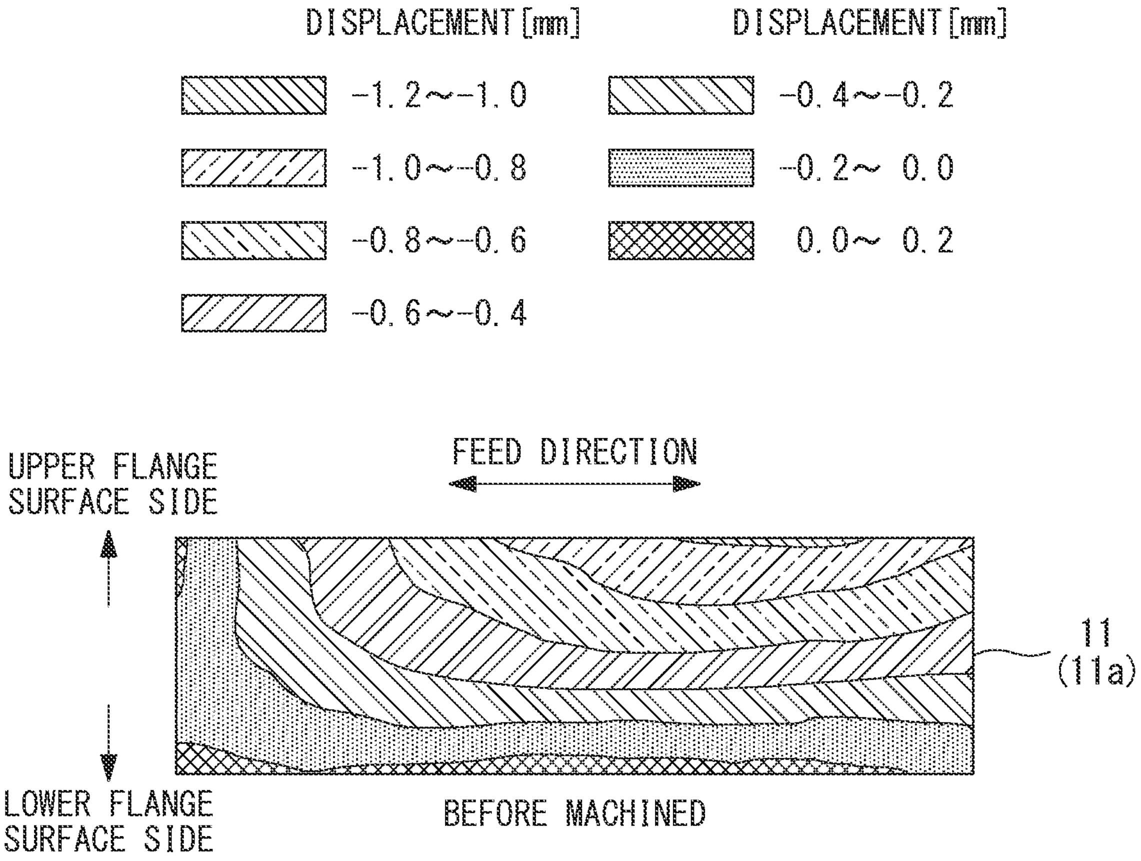
FIG. 10 is a diagram illustrating a displacement of a machined surface after a workpiece is attached to the jig and before the workpiece is machined according to one embodiment of the present disclosure.

In the workpiece 10 attached to the jig 20 as described above, a distribution of distortion (corrugation/separation and rising) as illustrated in FIG. 10 has occurred in the machined surface 11*a* of the web part 11.

Figure 12:
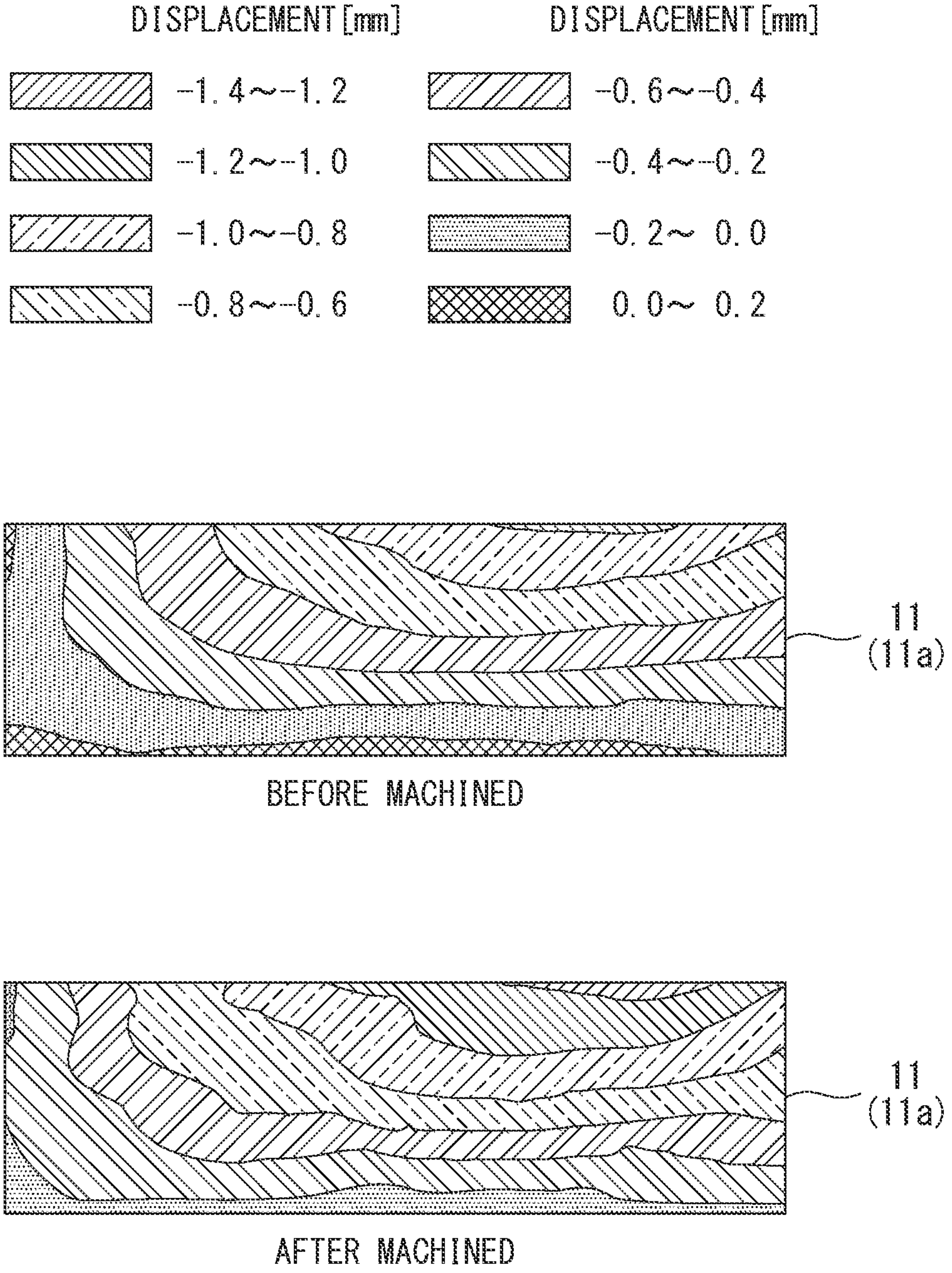
FIG. 12 represents diagrams illustrating a displacement of a machined surface after a workpiece is attached to the jig and then machined according to one embodiment of the present disclosure.

Note that FIG. 10 represents the arc-shaped machined surface 11*a* in an orthogonal coordinate system (the same applies for FIG. 12).

Each hatched legend represents a difference in the actual position of the workpiece 10 from the CAD model when the XYZ origin is defined in the base 30. It is thus noted that the numeric value thereof is not an absolute value but a relative value (the same applies for FIG. 12).

Machining Method

After completion of attachment of the workpiece 10, a tool is used to cut the machined surface 11*a* of the web part 11, the machined surface 12*a* of the upper flange part 12, and the machined surface 13*a* of the lower flange part 13.

Figure 11:
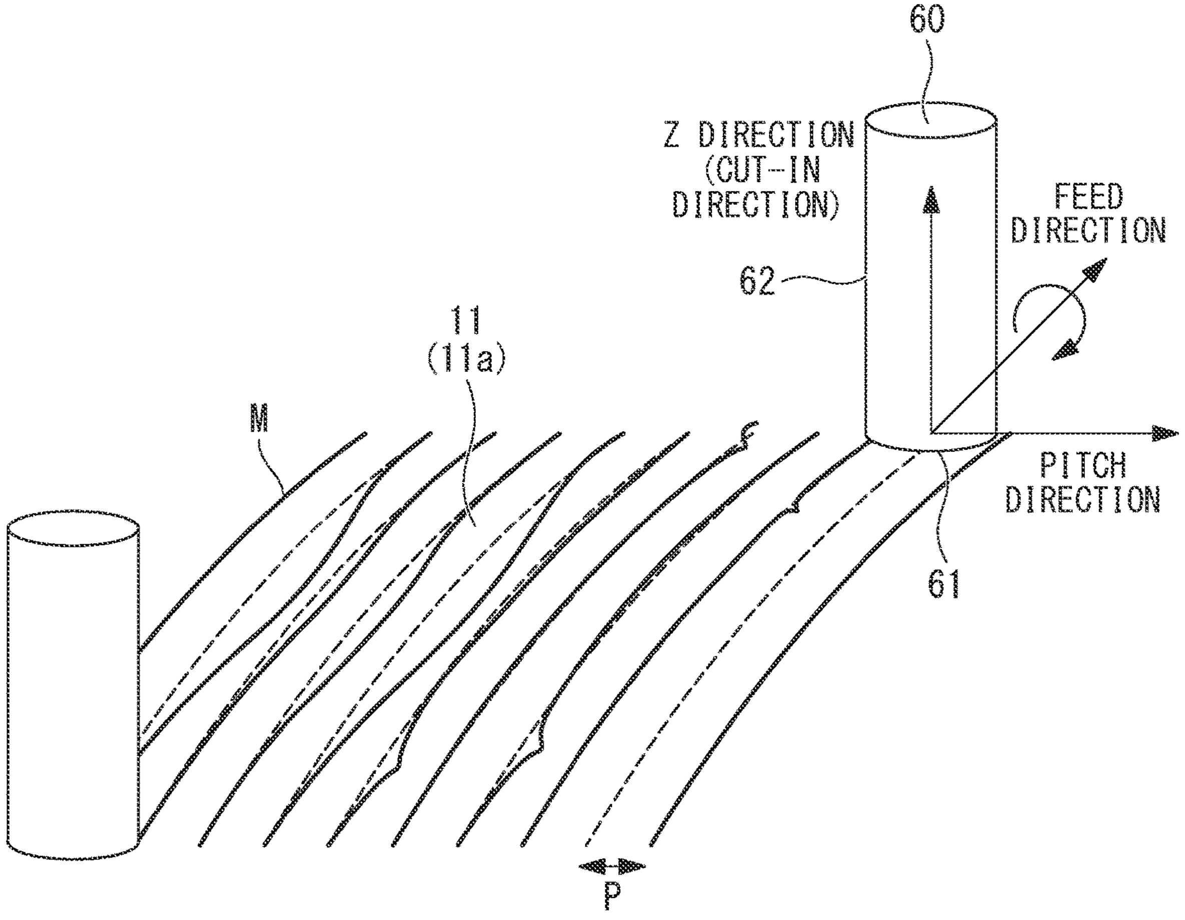
FIG. 11 is a perspective view illustrating a state where a workpiece is machined by an end mill according to one embodiment of the present disclosure.

As illustrated in FIG. 11, the tool is a known end mill (square end mill) 60 having an end cutting edge 61 and a peripheral cutting edge 62. Note that the tool 60 may be a radius end mill. The end mill 60 is preferably an end mill whose surface used for performing machining formed by the end cutting edge 61 is flat.

The following description is provided with an example of a square end mill.

The overview of the machining method is as follows.

The machined surface 12*a* of the upper flange part 12 where distortion has been reformed is cut with a single path by using the peripheral cutting edge 62 of the end mill 60 (flange cutting step). In this step, the end mill 60 is fed from one end to the other end in substantially an arc-shaped manner.

Next, the machined surface 11*a* of the web part 11 where distortion has been aggregated is cut with a plurality of paths by using the end cutting edge 61 of the end mill 60 (web cutting step). In this step, the end mill 60 is fed from one end to the other end in substantially an arc-shaped manner.

When the pitch of the end mill 60 per path is P, $0 \leq P \leq$ end mill diameter is met.

Cutting of the machined surface 11*a* of the web part 11 is performed so as to follow the shape (distribution) of the distortion that has occurred in the machined surface 11*a* of the web part 11 after the attachment to the jig 20 and before the machining. Accordingly, it is possible to perform plate thinning machining on the web part 11 at a constant cut amount in accordance with the shape of distortion.

As a result, as illustrated in FIG. 12, distortion has occurred in the machined surface 11*a* of the web part 11 obtained after cutting machining, and the distortion is substantially direct transfer of the shape of distortion that has occurred after the attachment to the jig 20 and before the machining. However, it can be seen that the plate thickness of the web part 11 is thinned for a portion cut by the end mill 60.

In machining of the web part 11, the attitude of the end mill 60 is controlled so as to follow the shape of distortion (details will be described later). Thus, a plurality of cutter marks M along the feed direction formed on the machined workpiece 10 (machined product) have the shape as illustrated in FIG. 11.

Thus, the pitch between the adjacent cutter marks M may change gradually in the extending direction of the cutter marks M, a smooth wave-shaped portion may appear in a continuous linear cutter mark M, and a cuspidal point without cutting-in may appear in a continuous linear cutter mark M. Further, the machined surface 11*a* has a multifaceted shape caused by the end cutting edge 61.

Next, the machined surface 13*a* of the lower flange part 13 where distortion has been reformed is cut with a single path by using the peripheral cutting edge 62 of the end mill 60 (flange cutting step). In this step, the end mill 60 is fed from one end to the other end in substantially an arc-shaped manner.

By going through the steps described above, it is possible to perform plate thinning machining on each machined surface of the upper flange part 12, the web part 11, and the lower flange part 13 without performing a set-up change.

In the machining method described above, a step of cutting the R-part 14 by using a cutting tool having a cutting edge in accordance with the shape of the R-part 14 (for example, a ball end mill (see reference numeral 97 indicated in FIG. 25) or a radius end mill) (R-part cutting step) may be included between the first web cutting step and the flange cutting step. In this step, the cutting tool is fed from one end to the other end in substantially an arc-shaped manner. Accordingly, efficient plate thinning machining without a set-up change and with less paths can be performed on the R-part 14 of the workpiece having a shape error.

A step of cutting the R-part 15 by using a cutting tool having a cutting edge in accordance with the shape of the R-part 15 (for example, an inverse R-cutter (see reference numeral 98 indicated in FIG. 25)) (R-part cutting step) may be included between the flange cutting step and the second web cutting step. In this step, the cutting tool is fed from one end to the other end in substantially an arc-shaped manner. Accordingly, efficient plate thinning machining without a set-up change and with less paths can be performed on the R-part 15 of the workpiece having a shape error.

A step of cutting the R-part 16 by using a cutting tool having a cutting edge in accordance with the shape of the R-part 16 (for example, an inverse R-cutter) (R-part cutting step) may be included after the second web cutting step. In this step, the cutting tool is fed from one end to the other end in substantially an arc-shaped manner. Accordingly, efficient plate thinning machining without a set-up change and with less paths can be performed on the R-part 16 of the workpiece having a shape error.

Machining System

A machining system 70 will be described.

The machining system 70 performs a machining control on a workpiece (target component) 10. Specifically, the machining system 70 controls a drive device that drives the end mill 60.

In the following description, a surface in the end mill 60 used for performing machining with the end cutting edge 61 is referred to as a "bottom surface" of the end mill 60, and a surface in the end mill 60 used for performing machining with the peripheral cutting edge 62 is referred to as a "side surface" of the end mill 60. Further, a machined surface machined by the bottom surface of the end mill 60, such as the machined surface 11*a* of the web part 11, is referred to as a "web surface" for illustration. A machined surface machined by the side surface of the end mill 60, such as the machined surface 12*a* of the upper flange part 12 and the machined surface 13*a* of the lower flange part 13, is referred to as a "flange surface" for illustration. A machined surface of an R-part connecting the web surface to the flange surface, such as the R-part 14 and the R-part 15, is referred to as an "R-surface".

Figure 13:
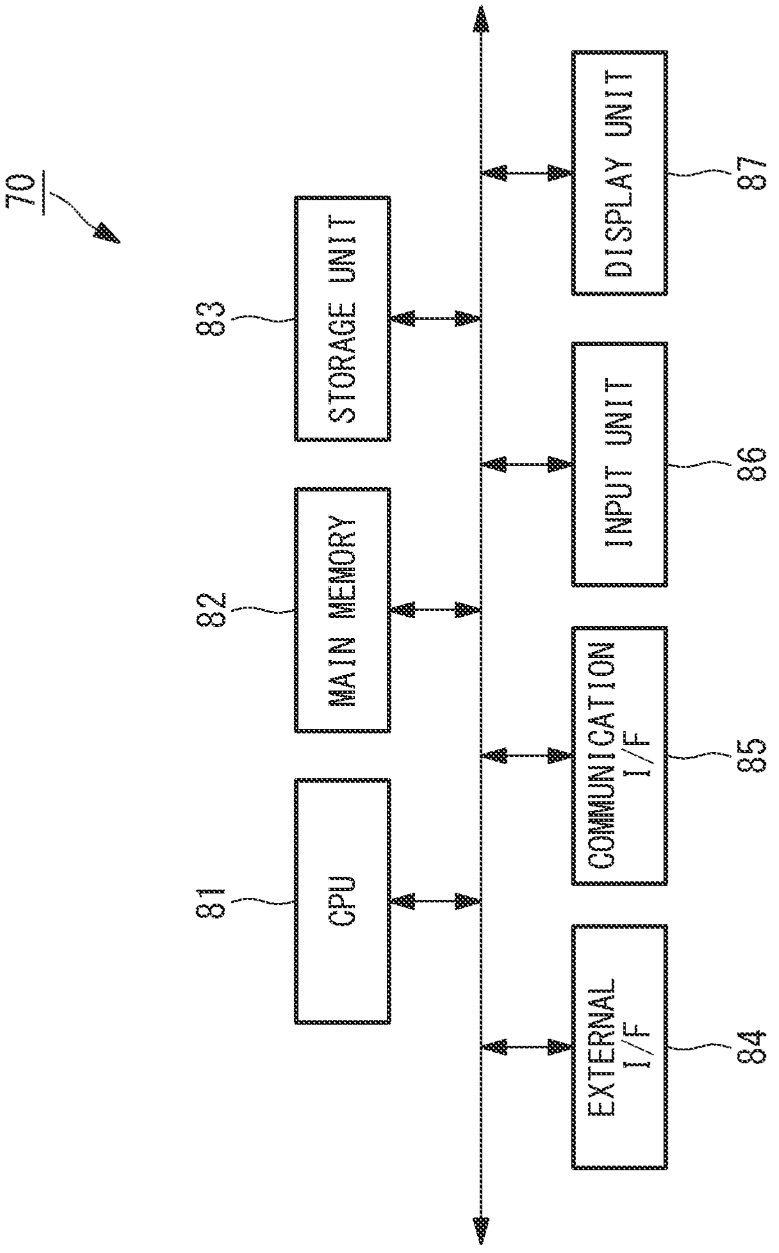
FIG. 13 is a schematic configuration diagram illustrating an example of a hardware configuration of a machining system according to one embodiment of the present disclosure.

FIG. 13 is a schematic configuration diagram illustrating an example of a hardware configuration of the machining system 70 according to one embodiment of the present disclosure. As illustrated in FIG. 13, the machining system 70 is a so-called computer and has a central processing unit (CPU) 81, a main memory 82, a storage unit 83, an external interface 84, a communication interface 85, an input unit 86, a display unit 87, and the like. These components are connected to each other directly or indirectly via a bus and perform various processes in cooperation with each other.

The CPU 81 performs control by using operating system (OS) stored in the storage unit 83 connected via a bus, for example, and performs various processes by executing various programs stored in the storage unit 83.

The main memory 82 is formed of a writable memory such as a cache memory, a random access memory (RAM), or the like, and is used as a working region where an execution program of the CPU 81 is loaded and writing of processing data or the like by the execution program is performed.

The storage unit 83 a non-transitory computer readable storage medium, which may be, for example, a read only memory (ROM), a hard disk drive (HDD), a flash memory, or the like. For example, the storage unit 83 stores OS such as Windows (registered trademark), iOS (registered trademark), Android (registered trademark), or the like used for performing overall control of the apparatus, Basic Input/Output System (BIOS), various device driver used for hardware operation of peripherals, various application software, various data or files, or the like. Further, the storage unit 83 stores a program used for implementing various processes or various data required for implementing various processes.

The external interface 84 is an interface for connection to an external device. An example of the external device may be an external monitor, a USB memory, an external HDD, or the like. Note that, although only one external interface is depicted in the example illustrated in FIG. 13, a plurality of external interfaces may be provided.

The communication interface 85 functions as an interface for communicating with another device through connection to a network and transmitting and receiving information.

For example, the communication interface 85 communicates with another device via a wired connection or a wireless connection, for example. Wireless communication may be communication using Bluetooth (registered trademark), Wi-Fi, a dedicated communication protocol, or the like. An example of wired communication may be a wired local area network (LAN) or the like.

The input unit 86 is a user interface used for providing an instruction, such as a keyboard, a mouse, a touch pad, or the like.

The display unit 87 is a liquid crystal display, an organic electroluminescence display, or the like. Further, the display unit 87 may be a touch panel display on which a touch panel is overlapped.

Figure 14:
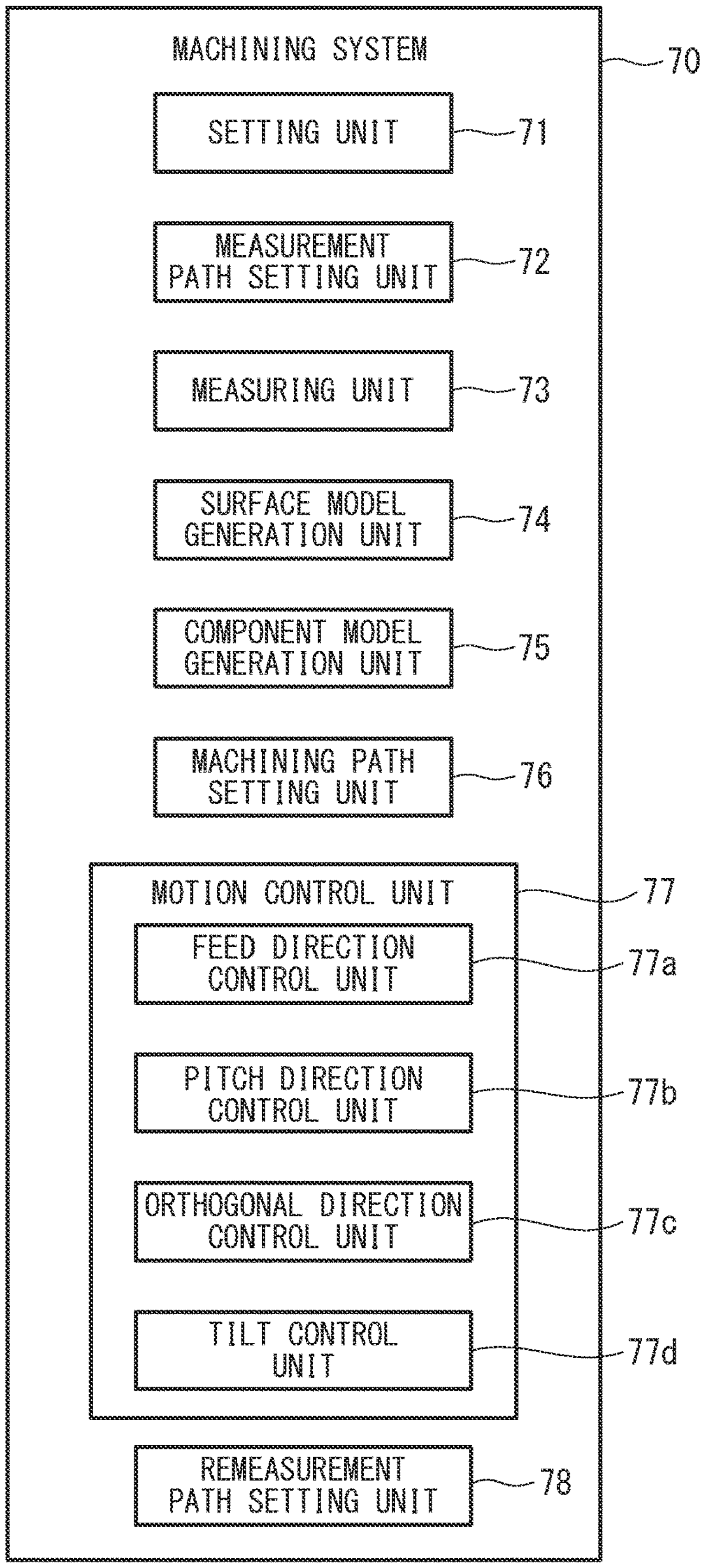
FIG. 14 is a function block diagram illustrating functions of the machining system according to one embodiment of the present disclosure.

FIG. 14 is a function block diagram illustrating functions of the machining system 70. As illustrated in FIG. 14, the machining system 70 includes a setting unit 71, a measurement path setting unit 72, a measuring unit 73, a surface model generation unit 74, a component model generation unit 75, a machining path setting unit 76, a movement control unit 77, and a remeasurement path setting unit 78.

The function implemented by each of these units is implemented by processing circuitry, for example. For example, a series of processes for implementing functions illustrated below are stored in the storage unit 83 in a form of a program as an example, and various functions are implemented when the CPU 81 loads such a program into the main memory 82 and performs information processing and calculation processes thereon.

Note that an applicable form of the program may be a form in which a program is installed in advance in the storage unit 83, a form in which a program is provided in a state of being stored in another computer readable storage medium, a form in which a program is delivered via a wired or wireless communication scheme, or the like. The computer readable storage medium may be a magnetic disk, a magneto-optical disk, a CD-ROM, a DVD-ROM, a semiconductor memory, or the like.

The setting unit 71 sets machining target surfaces corresponding to the bottom surface and the side surface of the end mill 60 for the workpiece 10, respectively, based on a design model of the workpiece 10. The design model is a model representing a design shape (ideal shape) of the workpiece 10. The design model is CAD data, for example. In the present embodiment, a case where the workpiece 10 is divided into a web surface (machined-by-bottom surface) machined by the bottom surface of the end mill 60, a flange surface (machined-by-side surface) machined by the side surface of the end mill 60, and the R-surface will be described as an example. In such a way, the setting unit 71 divides the machined surface of the workpiece 10 into a plurality of machining target surfaces.

The measurement path setting unit 72 sets a measurement path based on a design model of the workpiece 10. Specifically, the measurement path setting unit 72 sets measurement paths on for each divided machining target surface. Each measurement path indicates a position where measurement is performed on the workpiece 10. For example, a plurality of measurement paths is set at a predetermined pitch.

The measuring unit 73 measures the three-dimensional shape of the workpiece 10. The measuring unit 73 controls a measuring instrument to perform measurement. The measurement instrument may be, for example, a line laser, a scan probe, a 3D scanner, or the like. Measurement of respective measurement paths is performed, and thereby the three-dimensional shape of the workpiece 10 is measured. The measurement is performed at a predetermined interval on the measurement path, and a measurement result is represented by point cloud information having three-dimensional coordinate values.

The measurement is performed in a state where the workpiece 10 is fixed to the jig 20 so that the workpiece 10 approaches the design shape. Specifically, the workpiece 10 is fixed by the jig 20 as illustrated in FIG. 4 to FIG. 7. Accordingly, the workpiece 10 is reformed to approach the design shape indicated by the design model of the workpiece 10. In particular, the flange surface is reformed to approach the design shape. By performing measurement in this state, it is possible to measure the three-dimensional shape of the workpiece 10 with higher precision.

The surface model generation unit 74 generates a surface model corresponding to respective machining target surfaces based on three-dimensional measurement data of respective machining target surfaces. Specifically, the surface model generation unit 74 acquires measurement data corresponding to respective machining target surfaces from the measuring unit 73. Since measurement data is point cloud information, respective measured positions are interpolated to generate information indicating a surface shape (surface model). Thus, the surface model is surface information indicating respective actual shapes of respective machining target surfaces. Various schemes can be applied to the method of generating a surface model without limitation.

The component model generation unit 75 combines respective surface models to generate a component model. Specifically, the component model generation unit 75 connects respective divided, measured, and generated surface models to each other to generate a component model indicating the actual shape of the workpiece 10. Accordingly, the workpiece 10 is modeled as a whole.

The component model generation unit 75 may perform anomaly determination based on continuity of a connection between surface models when combining respective surface models. For example, when surface models are combined, if at least any one of a gap and a level difference between the surface models is greater than or equal to a predetermined value (if there is discontinuity), it is determined that there is an anomaly. Thus, when there is an error in a process such as measurement or generation of a surface model and thus a component model is not accurately expressed, it is determined that there is an anomaly.

The machining path setting unit 76 sets a machining path based on a three-dimensional shape of the measured workpiece 10. Specifically, the machining path setting unit 76 acquires a component model and then sets a machining path based on the component model. A machining path is set by using a component model in which respective surface models are combined, and thereby a machining path which takes a relationship between a plurality of surfaces into consideration can be set. A machining path indicates positions where machining is performed on the workpiece 10. When a machining path is set on the machined surface 11*a* that is a web surface, for example, a machining path is set in an arc-shaped manner in accordance with the arc shape of the machined surface 11*a*. When a machining path is set on the machined surface 12*a* that is a flange surface, for example, a machining path is set in an arc-shaped manner in accordance with the arc shape of the machined surface 12*a*. The shape of the machining path is not limited.

A machining path includes not only the guideline function but also information indicating a tilt angle of the end mill 60. The machining path setting unit 76 sets a tilt angle. Specific setting of the tilt angle will be described later.

The movement control unit 77 performs control to move the end mill 60 along a machining path. As illustrated in FIG. 14, the movement control unit 77 includes a feed direction control unit 77*a*, a pitch direction control unit 77*b*, an orthogonal direction control unit 77*c*, and a tilt control unit 77*d*.

The feed direction control unit 77*a* moves the end mill 60 in a feed direction in which the end mill 60 is moved along a machining path. Thus, the feed direction control unit 77*a* moves the end mill 60 on a machining path so that the end mill 60 passes on the machining path. For example, control is performed so that the center of the bottom surface of the end mill 60 moves on a machining path.

The pitch direction control unit 77*b* moves the end mill 60 in a pitch direction. The pitch direction is a vertical direction to the feed direction. The feed direction, the pitch direction, and the z direction described later (for example, the perpendicular direction) are in an orthogonal relationship to each other (FIG. 11). A plurality of machining paths are provided at a predetermined pitch (stepover) P in the pitch direction on the web surface, for example. Thus, the pitch direction control unit 77*b* moves the end mill 60 by the predetermined pitch P in the pitch direction and thereby moves the end mill 60 from one machining path to another. For example, after machining on one machining path ends, the end mill 60 is moved to another machining path (adjacent machining path) where next machining is performed.

The orthogonal direction control unit 77*c* moves the end mill 60 in the z direction (cut-in direction). Thus, the orthogonal direction control unit 77*c* moves the end mill 60 in the z direction to adjust the position in the z direction in which machining is performed by the side surface or the bottom surface of the end mill 60.

The tilt control unit 77*d* controls the tilt angle about an axis in the feed direction of the end mill 60 (for example, about a machining path). Specifically, the end mill 60 is tilted in accordance with a tilt angle set for a machining path. Thus, attitude control of the end mill 60 is performed by the tilt control unit 77*d*. The tilt angle is defined by the inclination of the center axis of the end mill 60 based on the initial attitude of the end mill 60 (for example, the center axis of the end mill 60 is parallel to the perpendicular direction) as a reference. For example, when the tilt angle of the initial attitude of the end mill 60 is 0 degree and the end mill 60 is then tilted by 5 degrees about the axis in the feed direction, the tilt angle is 5 degrees. A specific example of machining by the end mill 60 involving attitude control will be described later.

The remeasurement path setting unit 78 is used when a machining target surface having a large error with respect to a design model is measured. In the present embodiment, as an example, the process by the remeasurement path setting unit 78 is not performed on the web surface or the flange surface but performed on the R-surface.

The remeasurement path setting unit 78 sets a remeasurement path based on the three-dimensional shape of the workpiece 10 measured based on a measurement path. Thus, the measurement path setting unit 72 sets a measurement path based on a design model, and the remeasurement path setting unit 78 sets a measurement path based on a surface model. When a process is performed by the remeasurement path setting unit 78 (that is, when the R-surface is targeted), the machining path setting unit 76 sets a machining path based on the three-dimensional shape of the workpiece 10 measured based on a remeasurement path.

Machining is performed based on the actual shape of the workpiece 10 in accordance with the processes performed by respective units described above. Machining is performed in a state where the workpiece 10 is fixed to the jig 20 so that the workpiece 10 approaches a design shape. It is possible to improve the continuity of a machined surface by performing attitude control on the end mill 60.

Machining of Web Surface

Specific machining of the web surface will be described.

Figure 15:
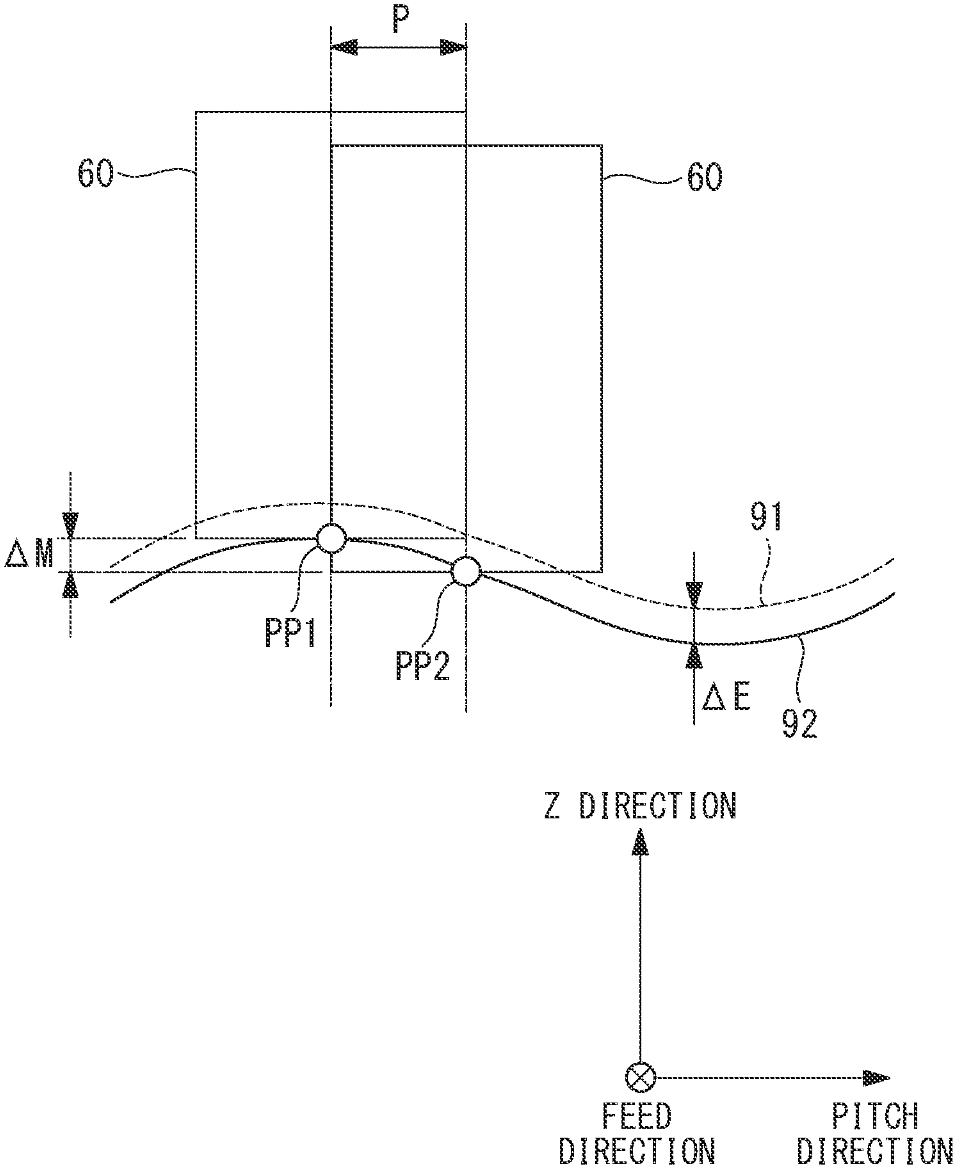
FIG. 15 is a diagram illustrating an example of machining on a web surface according to one embodiment of the present disclosure.
Figure 16:
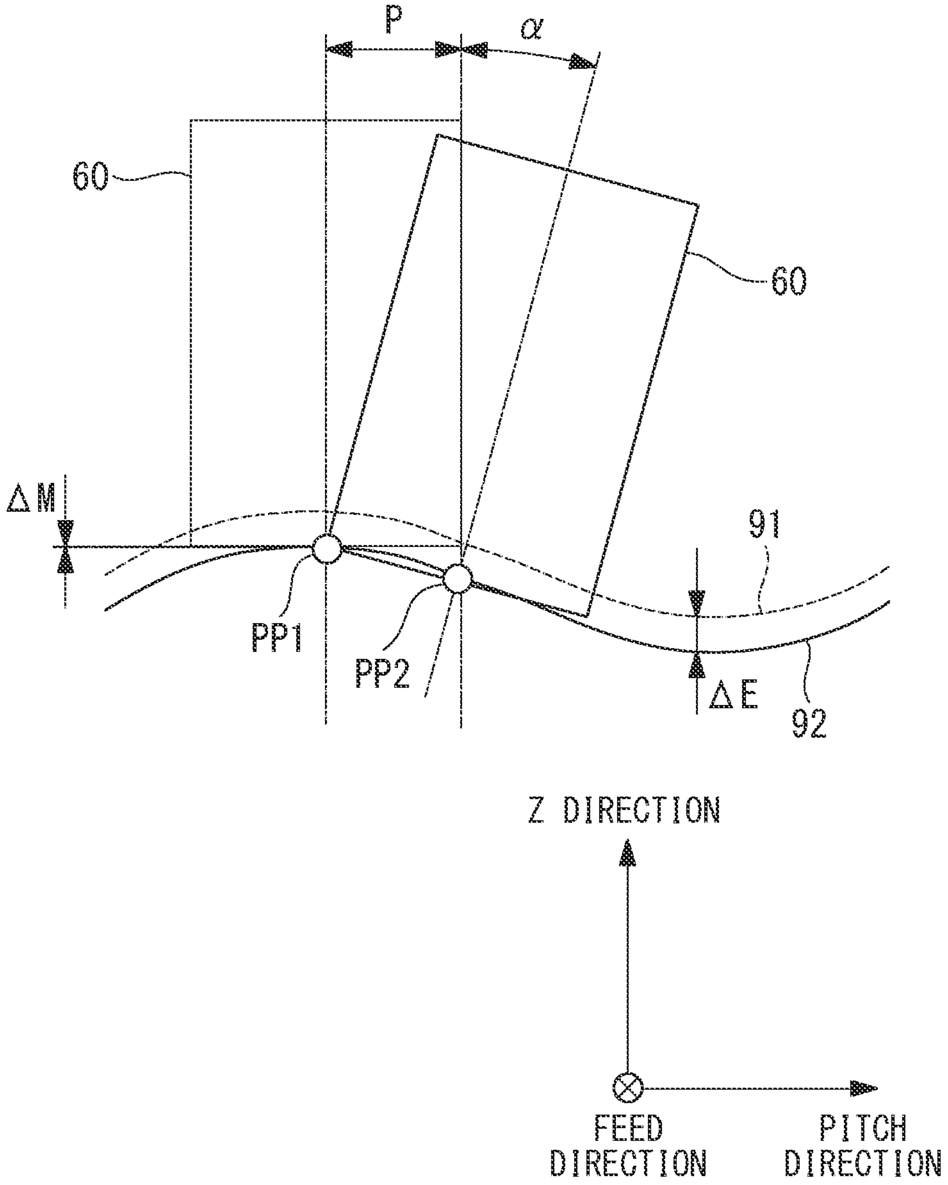
FIG. 16 is a diagram illustrating an example of machining on a web surface according to one embodiment of the present disclosure.

FIG. 15 illustrates an example of a case where no attitude control of the end mill 60 is performed. FIG. 16 illustrates an example of a case where attitude control of the end mill 60 is performed. FIG. 15 and FIG. 16 illustrate a unmachined surface 91 and an ideal machined surface 92.

A plurality of machining paths are set at a predetermined pitch P in the pitch direction on the web surface in order to perform machining by the bottom surface of the end mill 60. For example, the machining path for the web surface is set at positions in a predetermined depth from the surface of the component model (that is, the unmachined surface 91). The end mill 60 is moved so that the center of the bottom surface of the end mill 60 passes on the machining path, and thereby cutting with a predetermined depth can be performed. The end mill 60 is a square end mill, and the bottom surface is flat. Thus, the web surface is subjected to cutting with a surface (plane) by the bottom surface of the end mill 60. In the example of FIG. 15 and FIG. 16, a case where two machining paths (a first machining path PP1 and a second machining path PP2) are set is illustrated as an example. After machining on the first machining path PP1 is performed, machining on the second machining path PP2 is performed.

As illustrated in FIG. 15, when the surface of the workpiece 10 is not flat and has distortion, if machining is performed without attitude control and with only the control of the feed direction, the pitch direction, and the z direction, a z direction error appears as a mismatch (level difference) ΔM between machining on the first machining path PP1 and machining on the second machining path PP2. Thus, if the attitude control is not performed, unevenness may occur on the surface of the web surface due to machining on respective machining paths.

FIG. 16 illustrates a case where control is performed on the feed direction, the pitch direction, the z direction, and the tilt direction (attitude) as with the present embodiment. When attitude control is performed, tilt angles are set in association with respective machining paths. Note that the tilt angle is set on a position basis even for the same machining path, and in machining on a particular machining path, the tilt angle is controlled in accordance with the position on the particular machining path.

FIG. 16 illustrates a case where the tilt angle of the first machining path PP1 is 0 degree, and the tilt angle of the second machining path PP2 is α degrees (α≠0). In such a way, by rotating the end mill 60 about the axis in the feed direction to control the attitude thereof, it is possible to perform machining so that the mismatch ΔM is reduced and the machined surface approaches the ideal machined surface 92.

The tilt angle is set so that, when adjacent machining paths are the first machining path PP1 and the second machining path PP2, the mismatch ΔM between a machined surface machined by the bottom surface of the end mill 60 on the first machining path PP1 and the machined surface machined by the bottom surface of the end mill 60 on the second machining path PP2 is less than or equal to a threshold. Thus, the tilt angle is set so that the mismatch ΔM as occurring in FIG. 15 is less than or equal to the threshold. Note that it is more preferable to set the tilt angle so that not only the mismatch ΔM but also a machining error (plate thickness error) ΔE is less than or equal to the threshold. The machining error ΔE is a distance between the unmachined surface 91 and a machined surface (machined depth). Because the tilt angle is set so that the mismatch ΔM (and the machining error ΔE) is less than or equal to the threshold and machining is performed, unevenness in the machined surface is reduced.

For example, when the diameter of the bottom surface of the end mill 60 is 10 mm or greater and 25 mm or less, the predetermined pitch P can be set to about 5 mm or greater and 20 mm or less. By performing plane machining by using the bottom surface of the end mill 60, it is possible to widen the predetermined pitch P to reduce the number of machining steps.

Although the case where a plurality of machining paths are set at a predetermined pitch P when a web surface is machined has been described in the above example, control may be performed on the predetermined pitch P. Specifically, the machining path setting unit 76 sets the predetermined pitch P based on the amount of slope in the pitch direction of the web surface. For example, by making the pitch of machining paths wider when the amount of slope in the pitch direction is smaller, it is possible to reduce duplication of machining and reduce the number of steps while performing machining by using the bottom surface of the end mill 60. On the other hand, when the amount of slope in the pitch direction is larger, the pitch may be made narrower to perform finer machining.

Figure 17:
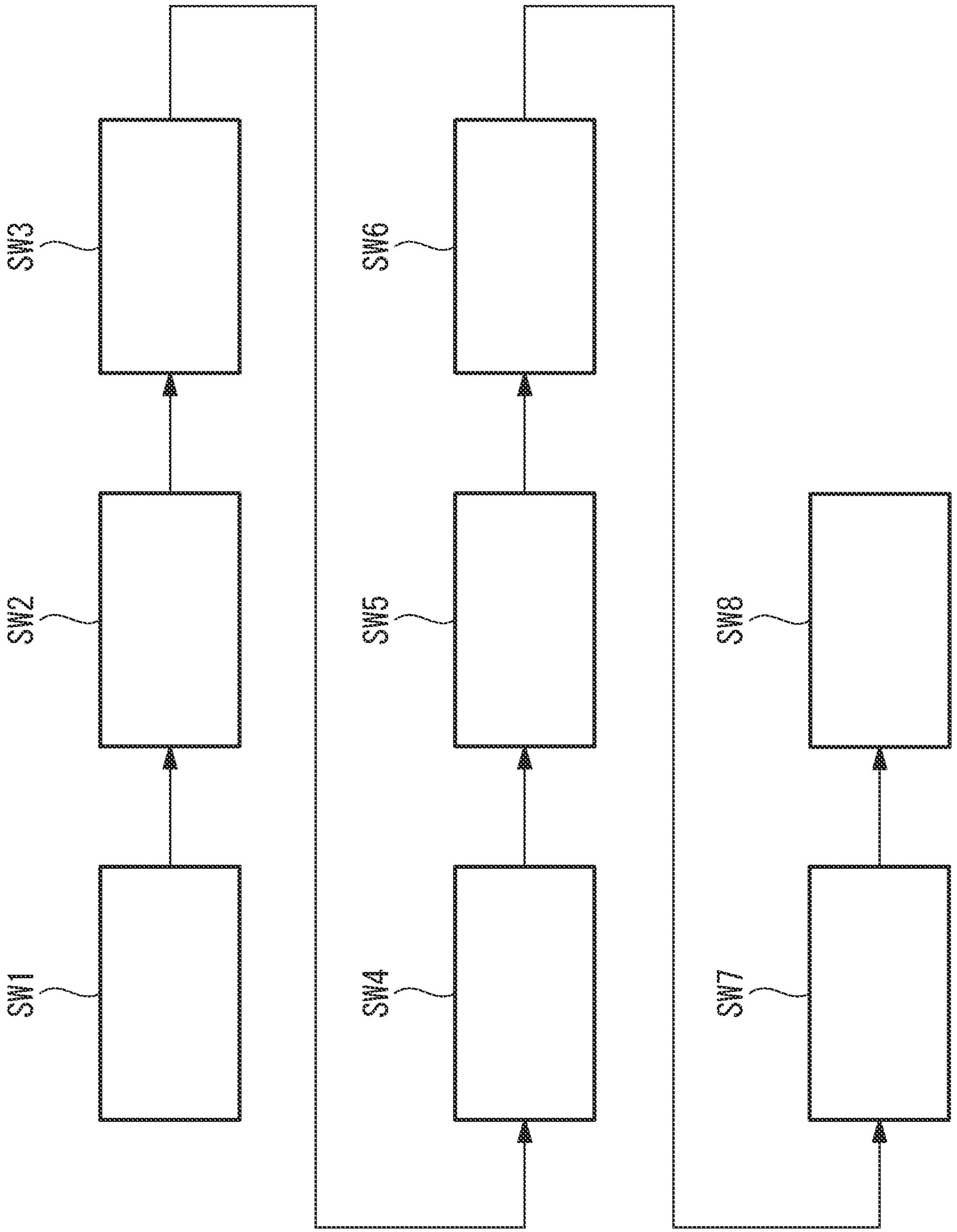
FIG. 17 is a diagram illustrating an overview of a flow of machining on a web surface according to one embodiment of the present disclosure.

FIG. 17 is a diagram illustrating the overview of a flow of the machining of a web surface. First, a web surface is set as a control point (SW1), and a measurement path is set for the web surface (SW2). Interference check is then performed (SW3), and measurement is performed (SW4). The interference check in SW3 is an operation to check whether or not the jig 20 interferes with measurement. If there is interference, no subsequent process is performed, or the path is corrected. A surface model of the web surface is then generated (SW5), and a machining path is set for the web surface (SW6). Interference check is then performed (SW7), and the machining is performed on the web surface (SW8). The interference check in SW7 is an operation to check whether or not the jig 20 interferes with machining to be performed. If there is interference, no subsequent process is performed, or the path is corrected.

When a web surface is machined, a plurality of machining paths are set in the pitch direction, and tilt angles are set for respective machining paths. This makes it possible to machine the web surface more flexibly with higher precision. In particular, in machining of adjacent machining paths, the tilt angles are set so that the level difference (mismatch) between respective machined surfaces machined by the bottom surface of the end mill 60 is less than or equal to a threshold. Therefore, between the machining paths, the machined surface can be made smooth and discontinuity can be controlled.

Machining of Flange Surface

Specific machining of a flange surface will be described.

Figure 18:
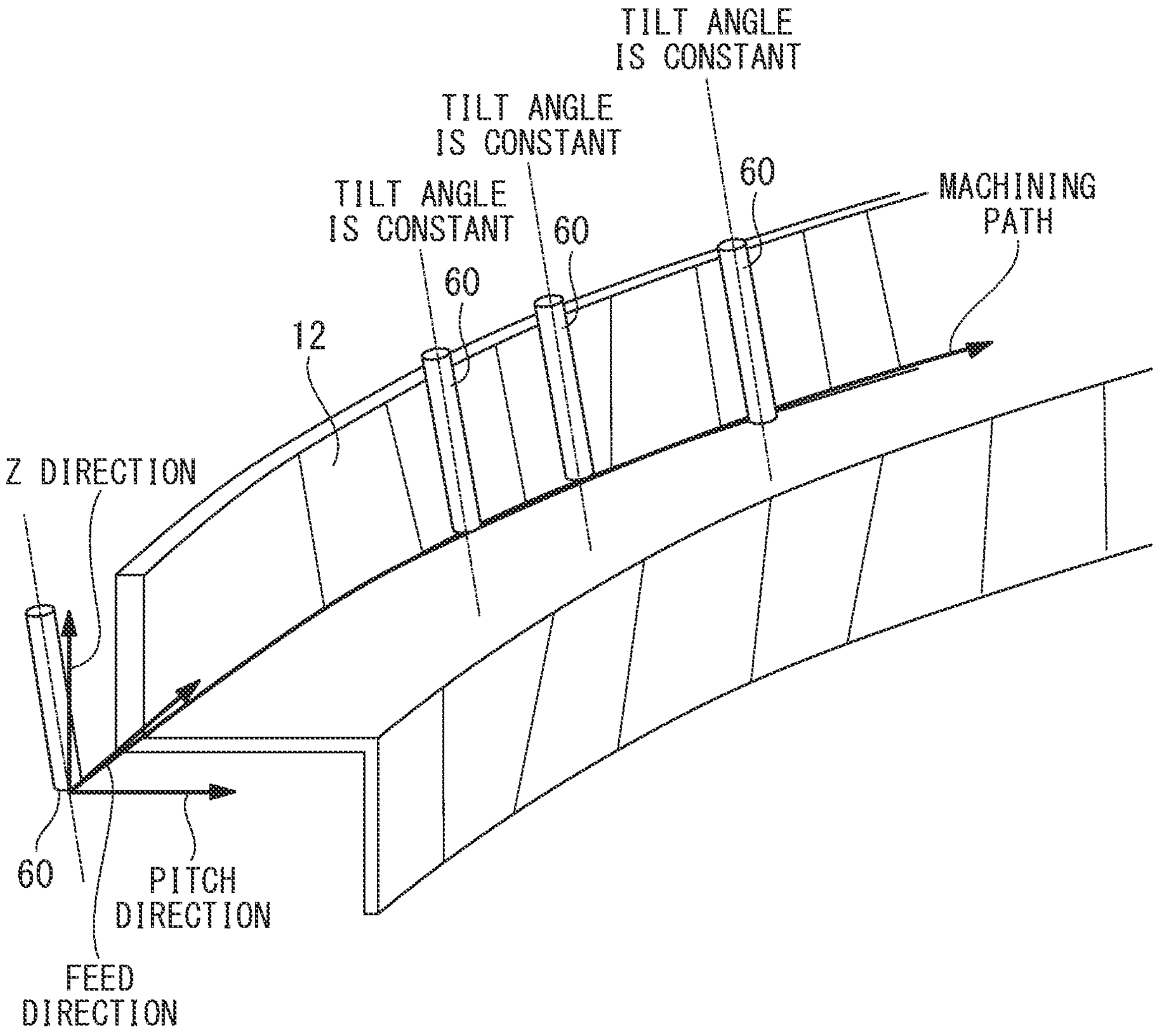
FIG. 18 is a diagram illustrating an example of machining on a flange surface according to one embodiment of the present disclosure.

FIG. 18 illustrates an example of a case where a flange surface (the machined surface 12*a* of the upper flange part 12) of the workpiece 10 is machined. The width (height dimension) of the flange surface is narrower than the range that can be machined by the side surface of the end mill 60.

As illustrated in FIG. 18, one machining path is set on a flange surface for the tool tip so that the flange surface can be machined from the lower end to the upper end. Thus, the end mill 60 is moved so that the center of the bottom surface of the end mill 60 passes on the machining path (tool tip point control).

Furthermore, one tilt angle (fixed tilt angle) is set on a machining path of the flange surface. Thus, the tilt control unit 77*d* controls the tilt angle of the end mill 60 to be constant at the fixed tilt angle while the end mill 60 moves along one machining path to machine the flange surface. Thus, one-shot machining is performed on one flange surface without a change of the attitude. The end mill 60 is moved along the machining path with the angle being fixed, and thereby cutting with a predetermined depth can be performed.

For the fixed tilt angle, it is preferable to use the mean value or the center value of slope angles (slope angles of the flange surface) at a plurality of positions in the longitudinal direction of the flange surface found from a measurement result of the flange surface. Even if the slope varies on the flange surface, by using the mean value or the center value as the fixed tilt angle, it is possible to reduce excessive cutting or insufficient cutting to make the slope of the flange surface even.

Figure 19:
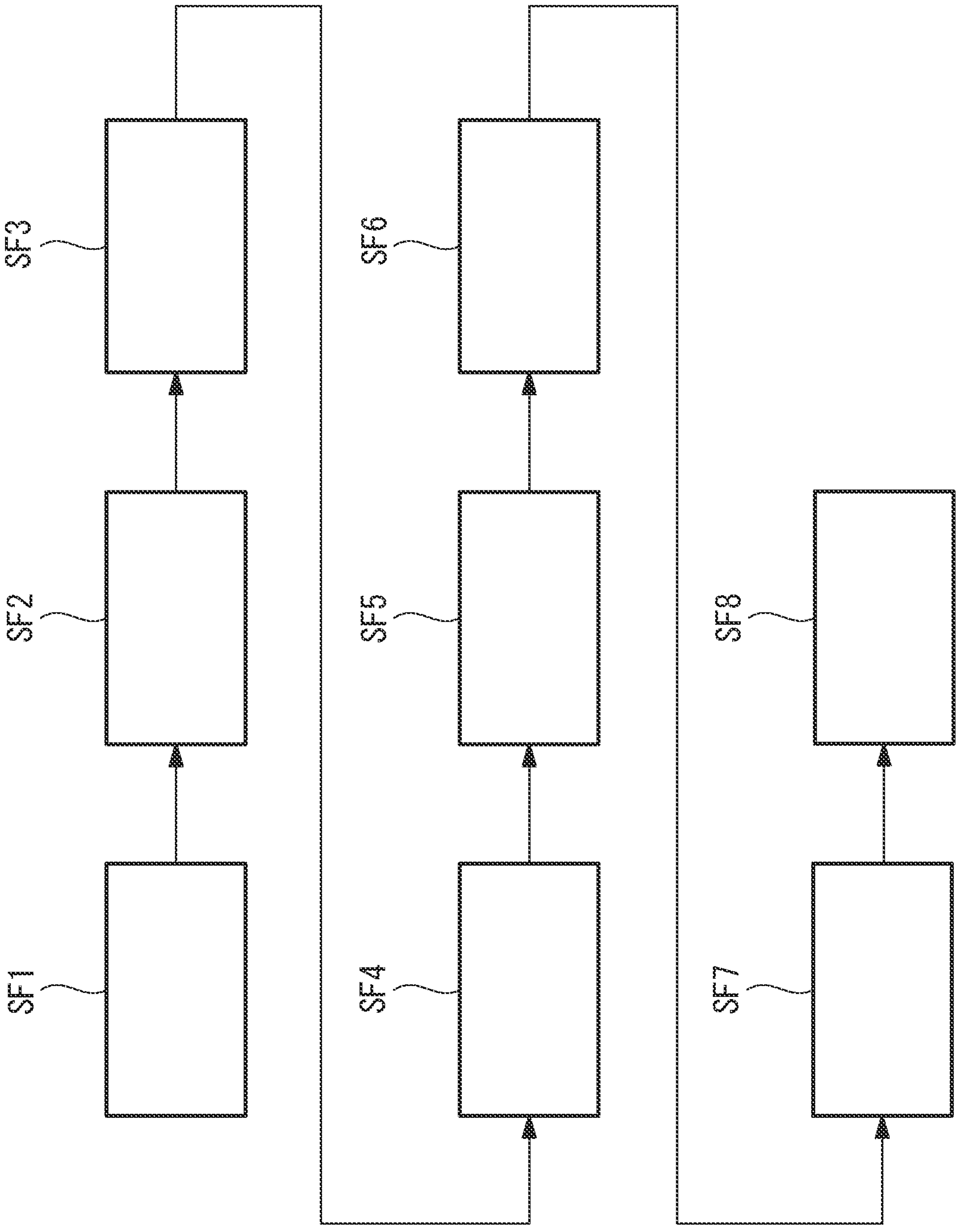
FIG. 19 is a diagram illustrating an overview of a flow of machining on a flange surface according to one embodiment of the present disclosure.

FIG. 19 is a diagram illustrating the overview of a flow of machining of the flange surface. First, a flange surface is set as a control point (SF1), and a measurement path is set for the flange surface (SF2). Interference check is then performed (SF3), and measurement is performed (SF4). The interference check in SF3 is an operation to check whether or not the jig 20 interferes with measurement. If there is interference, no subsequent process is performed, or the path is corrected. A surface model of the flange surface is then generated (SF5), and a machining path is set for the flange surface (SF6). Interference check is then performed (SF7), and the machining is performed on the flange surface (SF8). The interference check in SF7 is an operation to check whether or not the jig 20 interferes with machining to be performed. If there is interference, no subsequent process is performed, or the path is corrected.

In such a way, for a flange surface, one tilt angle (fixed tilt angle) is set for one flange surface, and the tilt angle is fixed when machining is performed. It is thus possible to machine a flange surface to have an even slope angle.

Measurement and Machining of R-Surface

Specific measurement and machining of an R-surface will be described.

The R-surface is a portion to connect a flange surface and a web surface to each other and is likely to have a large error with respect to a design model. Thus, multiple times of measurement are performed by using a process of the remeasurement path setting unit 78.

Figure 20:
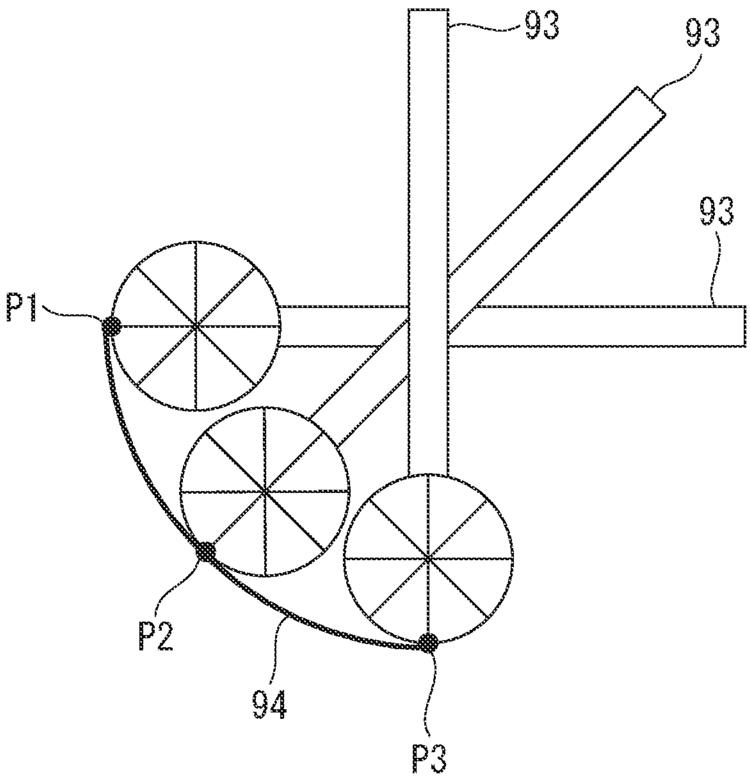
FIG. 20 is a diagram illustrating an example of measurement of an R-surface according to one embodiment of the present disclosure.

FIG. 20 is a diagram illustrating an example of a case where the workpiece 10 is measured based on a design model. Note that a case where the probe 93 is used to perform measurement will be described as an example. When a measurement path is set based on a design model, a measurement point (a point on the measurement path) is set for the workpiece 10 of a design shape. FIG. 20 illustrates measurement points P1, P2, and P3 on a design model R-surface 94. For example, when measurement is performed on the measurement point of P1, the result of the measurement will be recognized as a measurement result for P1 on the machining system 70 side.

Figure 21:
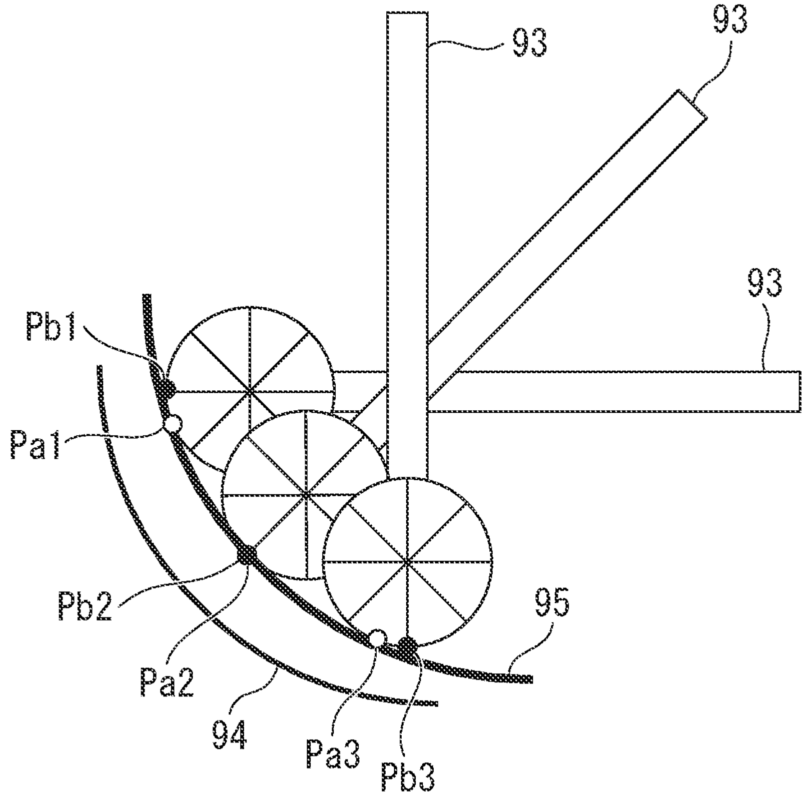
FIG. 21 is a diagram illustrating an example of measurement of the R-surface according to one embodiment of the present disclosure.
Figure 22:
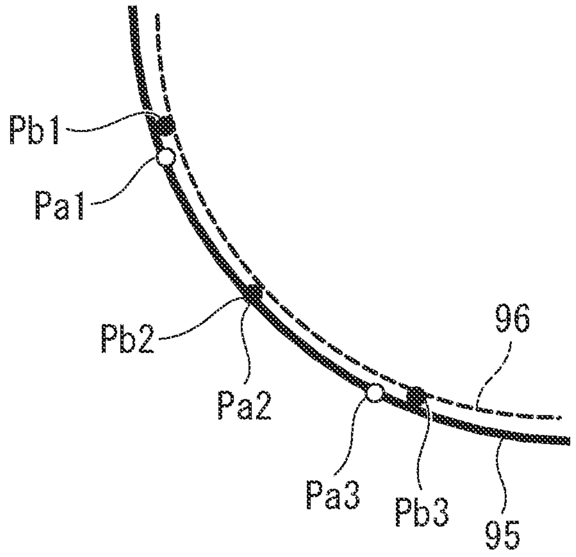
FIG. 22 is a diagram illustrating an example of measurement of the R-surface according to one embodiment of the present disclosure.

However, as illustrated in FIG. 21, when an R-surface having a large shape error with respect to a design model is measured, even though it is intended to measure Pa1, Pa2, Pa3, which are measurement points of an actual R-surface 95 of the workpiece 10 that are supposed to correspond to measurement points (P1, P2, P3), the measurement positions provided by the probe 93 may be positions (Pb1, Pb2, Pb3), which are displaced from the measurement points. In such a case, for example, the measurement result of Pb1 will be recognized as the measurement result of Pa1 on the machining system 70 side. Thus, if a surface model is generated based on measurement results including measurement errors, a surface model 96, which is different from the actual R-surface 95 of the workpiece 10 may be generated as illustrated in FIG. 22.

Figure 23:
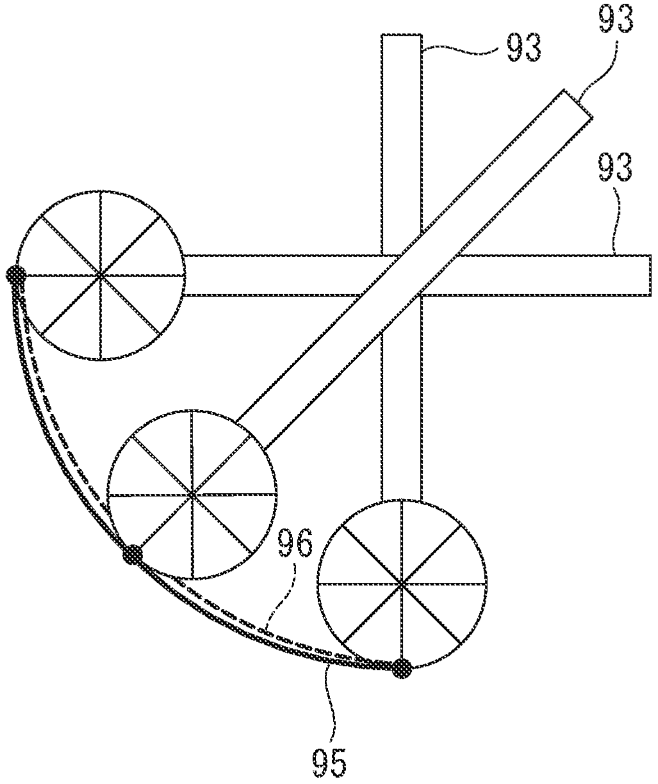
FIG. 23 is a diagram illustrating an example of measurement of the R-surface according to one embodiment of the present disclosure.

Thus, when measurement on an R-surface is performed, the process performed by the remeasurement path setting unit 78 is applied. Specifically, as with the case of a web surface or the like, a measurement path is set based on a design model to perform measurement (corresponding to FIG. 21). A surface model is then generated based on a measurement result (corresponding to FIG. 22). The measurement path is then set by the remeasurement path setting unit 78 based on the surface model (the surface model 96 of FIG. 22). Thus, a measurement path (remeasurement path) indicating portions on which measurement is to be performed is set on the surface model. As illustrated in FIG. 23, measurement is performed based on the remeasurement path. This reduces the error between a measurement point set for the surface model and a measurement position actually measured for the workpiece 10. A surface model is then regenerated based on the measurement result in accordance with the remeasurement path.

The machining path setting unit 76 generates a machining path based on the regenerated surface model. Accordingly, it is possible to accurately make a surface modeled for the R-surface having a large error with respect to a design model to perform machining.

Figure 24:
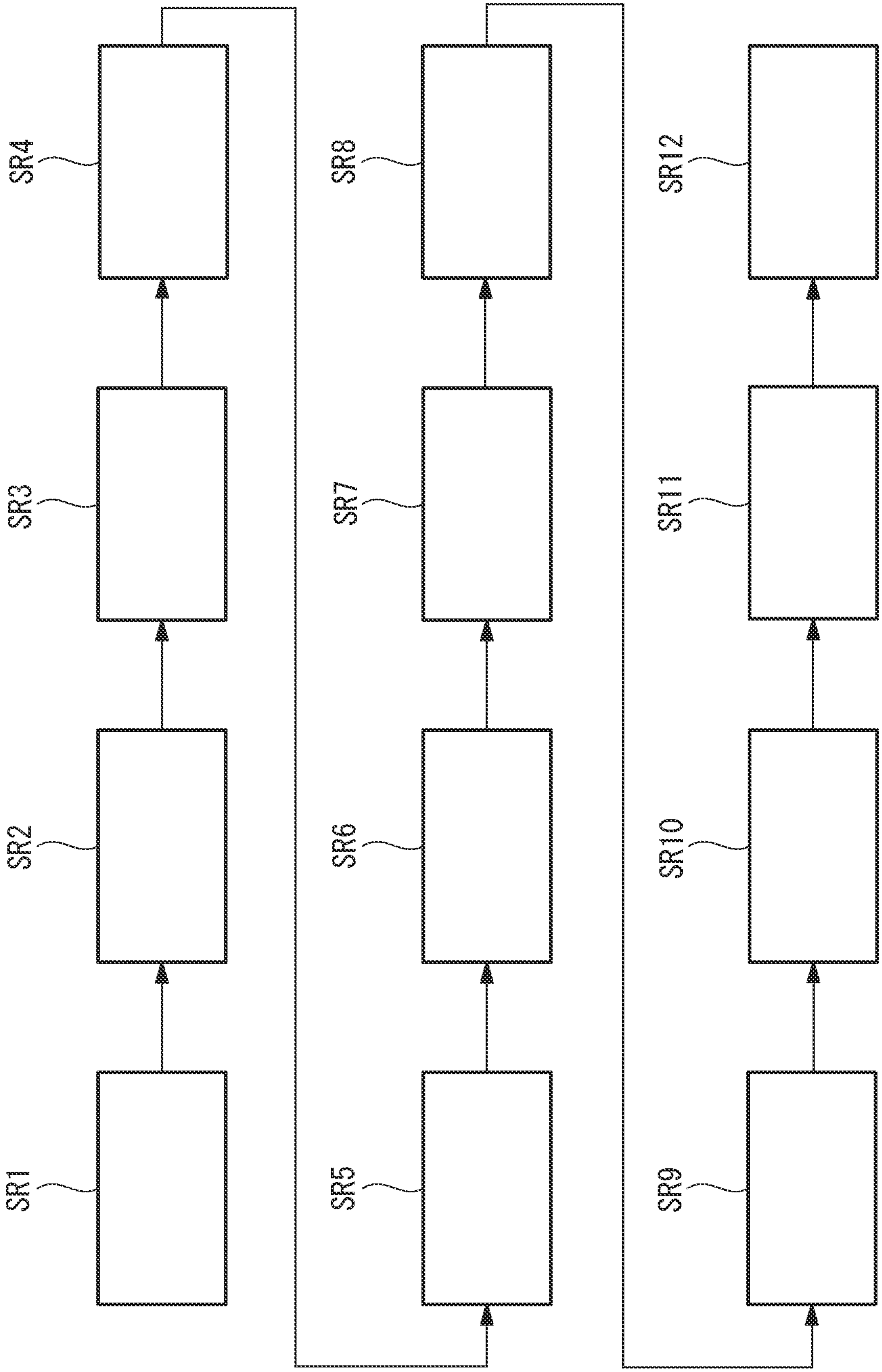
FIG. 24 is a diagram illustrating an overview of a flow of machining on the R-surface according to one embodiment of the present disclosure.

FIG. 24 is a diagram illustrating the overview of a flow of machining of an R-surface. An R-surface is set as a control point (SR1), and a measurement path is set for the R-surface (SR2). Interference check is performed (SR3), and measurement is performed (SR4). The interference check in SR3 is an operation to check whether or not the jig 20 interferes with measurement. If there is interference, no subsequent process is performed, or the path is corrected. A surface model of the R-surface is generated (SR5). A remeasurement path is set for the R-surface (SR6). Interference check is performed (SR7), measurement based on the remeasurement path is performed (SR8), and a surface model of the R-surface is regenerated (SR9). The interference check in SR7 is the same as the interference check in SR3. A machining path is set for the R-surface (SR10). Interference check is then performed (SR11), and machining is performed on the R-surface (SR12). The interference check in SR11 is an operation to check whether or not the jig 20 interferes with machining to be performed. If there is interference, no subsequent process is performed, or the path is corrected.

In such a way, a surface model is generated and a machining path is set for an R-surface through multiple times of measurement.

Figure 25:
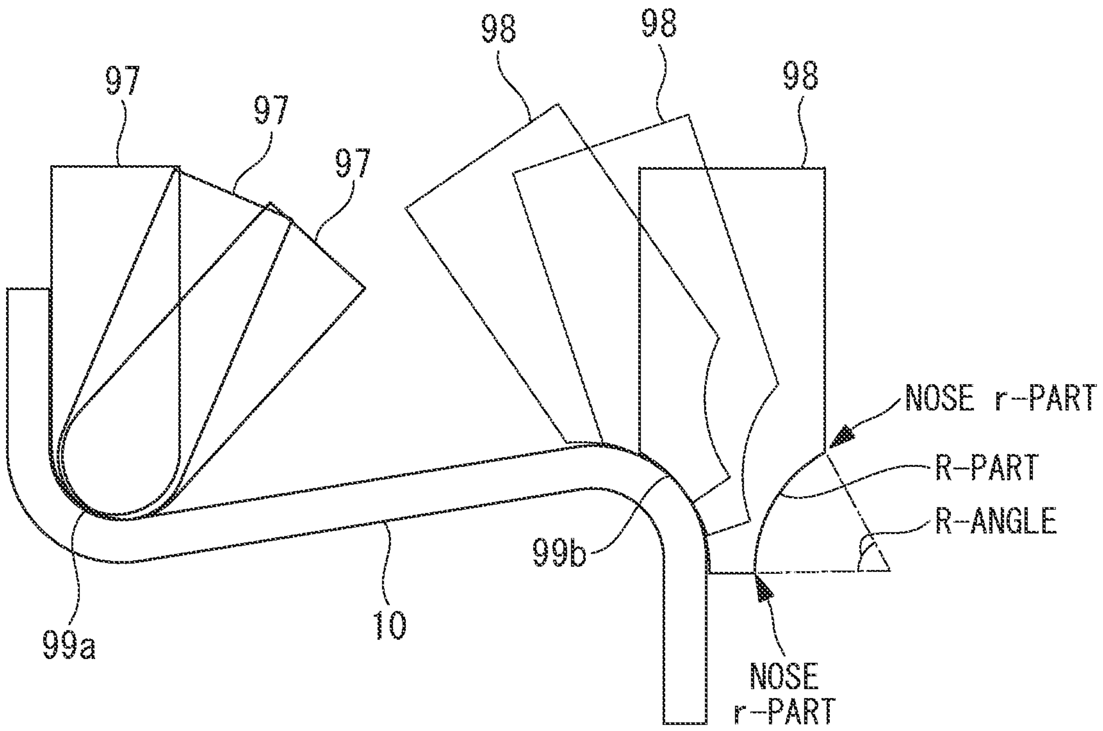
FIG. 25 is a diagram illustrating an example of machining on R-surfaces according to one embodiment of the present disclosure.

FIG. 25 is a diagram illustrating an example of a case where an R-surface is machined. FIG. 25 illustrates a case where an inside corner R-surface 99*a* that is the R-surface of the R-part 14 and an outside corner R-surface 99*b* that is the R-surface of the R-part 15 are machined. When the inside corner R-surface 99*a* is machined by a ball end mill having a radius of curvature equal to the design shape, if the workpiece 10 has a shape error with respect to the design shape, this may cause excessive cutting, and a mismatch may occur. Thus, when the inside corner R-surface 99*a* is machined, it is preferable to perform machining by a ball end mill unlike the above or a radius end mill with cutting path following measured result. Note that the inside corner R-surface 99*a* may be machined by a ball end mill 97 having a smaller radius of curvature than the radius of curvature of the design shape of the inside corner R-surface 99*a*.

When the outside corner R-surface 99*b* is machined by an inverse R-cutter having a radius of curvature equal to the design shape, if the workpiece 10 has a shape error with respect to the design shape, this may cause insufficient or excessive cutting, and a mismatch may occur. When the outside corner R-surface 99*b* is machined, it is preferable to perform machining by using an inverse R-cutter (corner R-cutter) 98 having an inverse R-part whose radius of curvature is larger than the radius of curvature of the design shape of the outside corner R-surface 99*b* and an angle range of the inverse R-part that is less than 90 degrees (the R-part angle as a cutting edge is less than 90 degrees). As illustrated in FIG. 25, in the inverse R-cutter 98, the R-angle of the R-part is less than 90 degrees. Both ends of the R-part of the inverse R-cutter 98 are provided with nose r-parts, and these nose r-parts prevent cut-in of the edge or a mismatch and thereby smooth the machined surface. The r-angle of the nose r-part can be the minimum necessary and is, for example, 10 degrees or greater.

As illustrated in FIG. 25, machining paths are set for respective R-surfaces, and machining is performed while attitude control is performed with respective machining paths. Machining can be performed with at least three paths for a connecting part between the R-part and the upper surface thereof, a connecting part between the R-part and the lower surface thereof, and the R-part. Specifically, the machining paths are each set in association with the connecting part between the flange surface and the R-surface, the connecting part between the web surface and the R-surface, and the R-surface of the R-part, and thereby machining can be efficiently performed with three paths. Note that the number of paths may be adjusted in accordance with surface roughness. This reduces occurrence of a mismatch with respect to another surface. In particular, for a portion of an outside corner R such as the outside corner R-surface 99*b*, even with a workpiece having an angular error, such as a sheet frame, the inverse R-cutter 98 is used to follow the R-shape to perform machining. With the use of the special inverse R-cutter 98 whose radius of curvature of the inverse R-part is less than 90 degrees (in typical inverse R-cutters, the inverse R-part is 90 degrees), it is possible to reduce the number of paths (for example, the minimum three paths) to efficiently machine the outside corner R-surface 99*b*. To perform additional machining along the R-shape, as illustrated in FIG. 25, it is possible to perform machining with high precision by using the entire surface of the inverse R-cutter 98. Thus, machining is performed so that the entire surface of the R-part, which is a portion of the inverse R-cutter 98 to perform machining, is fitted along the outside corner R-surface 99*b*. For example, typical inverse R-cutters are to perform machining by abutting a part of the R-part (not the entire surface thereof) against the outside corner of a workpiece. Note that, although the case where the R-surface is machined by the tool as illustrated in FIG. 25 has been described in the above example, a radius end mill may be used. Note that the R-surface (the outside corner R-surface) of the R-part 16 may be machined in the same manner.

Machining Process

Figure 26:
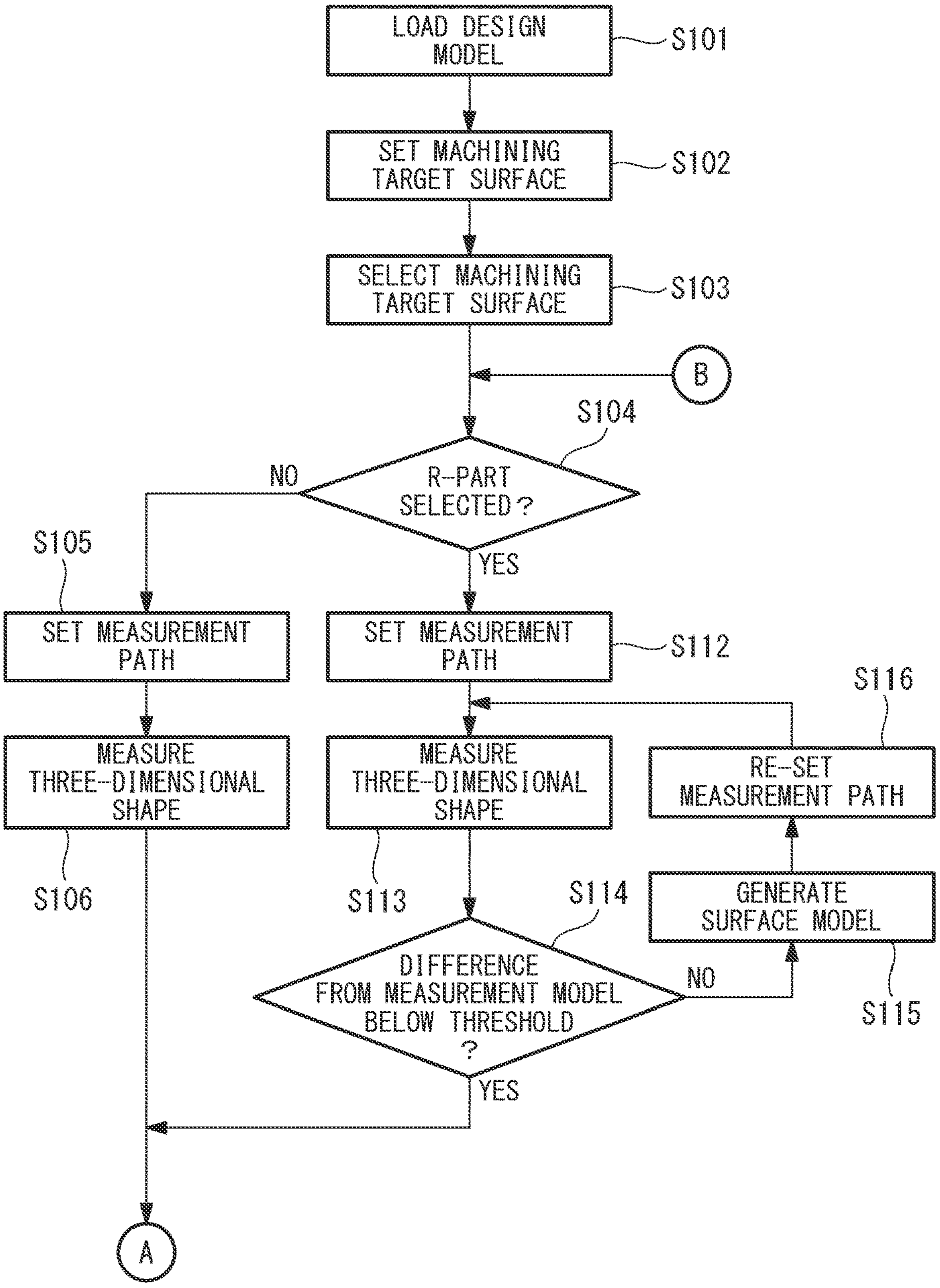
FIG. 26 is a flowchart illustrating an example of a procedure of a machining process according to one embodiment of the present disclosure.
Figure 27:
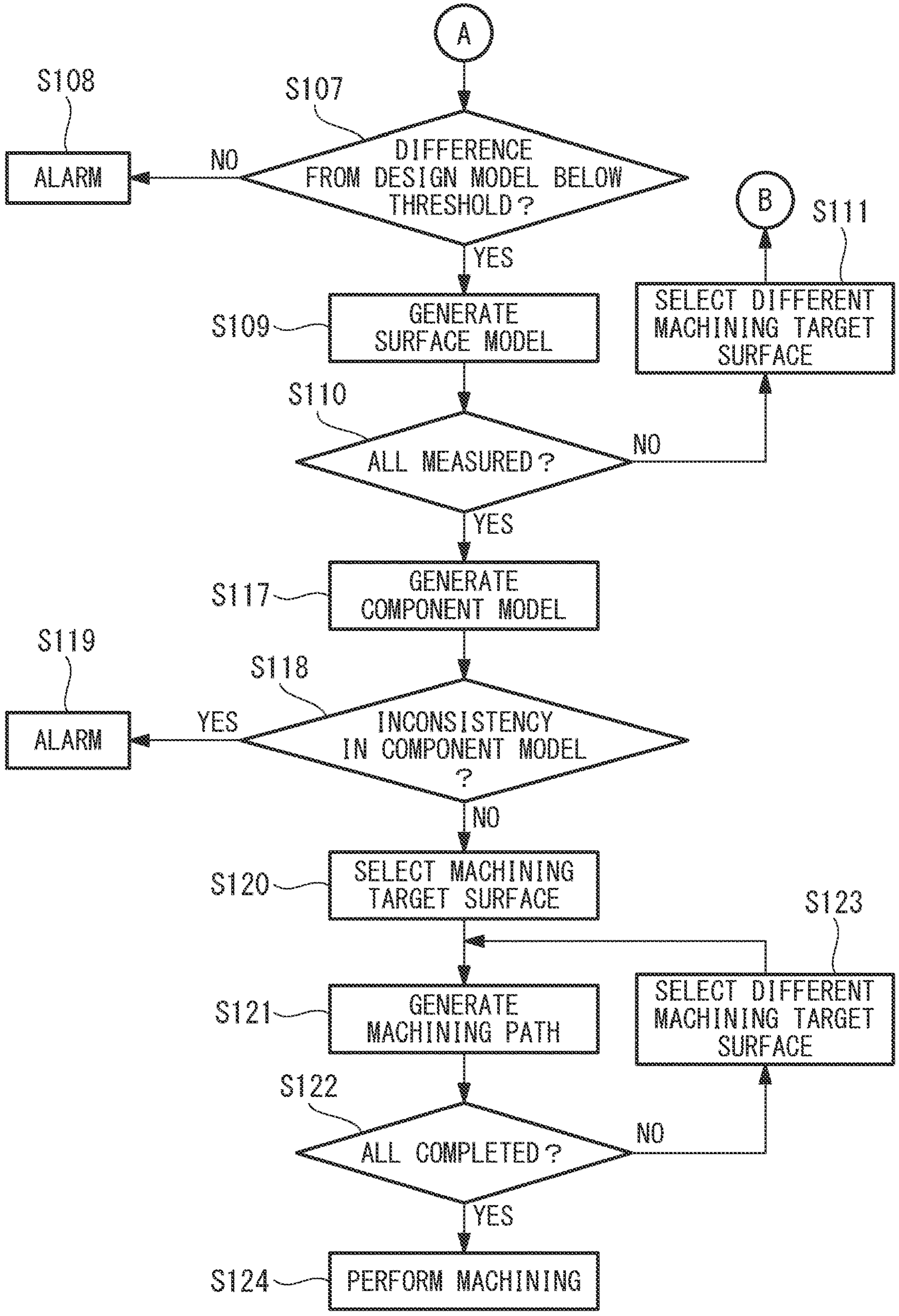
FIG. 27 is a flowchart illustrating an example of the procedure of the machining process according to one embodiment of the present disclosure.

An example of the machining process performed by the machining system 70 described above will be described with reference to FIG. 26 and FIG. 27. FIG. 26 and FIG. 27 are a flowchart illustrating an example of a procedure of the machining process according to the present embodiment. The flow is divided into parts of FIG. 26 and FIG. 27 for illustration.

First, a design model of the workpiece 10 is loaded (S101). Next, machining target surfaces are set (S102). The machining target surfaces are a web surface, a flange surface, and an R-surface. Next, one of the divided machining target surfaces is selected (S103). Next, it is determined whether or not the R-surface is selected (S104). If the R-surface is not selected (S104, NO), a measurement path is set for the selected machining target surface based on the design model (S105). Measurement is then performed based on the measurement path (S106).

It is determined whether or not the difference between the design model and the measurement result is less than or equal to a threshold (S107). For example, if there is even one portion where the difference (displacement) between the design model and the measurement result is not less than or equal to the threshold, NO is determined in S107. If the difference between the design model and the measurement result is not less than or equal to the threshold (S107, NO), an alarm is issued to notify that the measurement result has an error or the shape of the workpiece 10 is significantly different from the design model (S108). With this alarm, it is possible to notify that there is a failure in a phase before machining.

If the difference between the design model and the measurement result is less than or equal to a threshold (S107, YES), a surface model is generated based on the measurement result for the selected machining target surface (S109). Next, it is determined whether or not all the measurement operations on respective divided machining target surfaces are completed (S110). If not all the measurement operations are completed (S110, NO), a different machining target surface from the selected machining target surface is selected (S111), and S104 is again performed.

If the R-surface is selected (S104, YES), a measurement path is set based on the design model of the R-surface (S112). Measurement is performed based on the measurement path (S113). Next, it is determined whether or not the difference between the design model and the measurement result is less than or equal to a threshold (S114). If YES is determined in S114, the process proceeds to S107. If the difference is not less than or equal to the threshold (S114, NO), a surface model of the R-surface is generated based on the measurement result (S115). A remeasurement path is then set based on the generated surface model (S116), and measurement is again performed (S113). With the process of S115 and S116, the measurement error is reduced, and YES is likely to be determined in S114.

If all the measurement operations are completed (S110, YES), respective surface models are combined to generate a component model (S117). It is determined whether or not there is inconsistency in the component model (S118). In S118, specifically, if at least any one of the gap and the level difference between the surface models is greater than or equal to a predetermined value, it is determined that there is inconsistency (S118, YES). If YES is determined in S118, an alarm is issued to notify that the component model is not accurately generated (S119).

If NO is determined in S118, a particular machining target surface is selected (S120), and a machining path corresponding to the selected machining target surface is generated based on the component model (S121). The machining path is set so as to also include tilt angle information used for attitude control. It is determined whether or not machining paths are set for all the machining target surfaces (S122). If machining paths are not set for all the machining target surfaces (S122, NO), a different machining target surface from the selected machining target surface is selected (S123), and S121 is again performed. If machining paths are set for all the machining target surfaces (S122, YES), machining on respective machining target surfaces is performed based on the machining paths (S124). In S124, machining on respective machining target surfaces is performed in the order set in advance, such as the order of the flange surface, the web surface, and the R-surface, for example.

As described above, according to the machining system and the machining apparatus, the machining method, and the machining program of the present embodiment, since control is performed not only on the feed direction and the z direction but also on the tilt angle of the end mill 60 about the axis of the feed direction, the slope of a surface machined by the end mill 60 is also controlled, and this enables higher-precision machining to be performed. For example, it is possible to improve the precision of machining performed after the workpiece 10 is molded, such as additional machining or weight reduction machining on a molded article or an assembly of a metal or a composite material. It is possible to effectively apply shape addition machining with an intended machining depth for a machined surface to a workpiece whose three-dimensional shape has a large shape error with respect to a CAD model, such as a sheet metal molded article, by using the bottom side surface of an end mill.

Since the level difference (mismatch) is reduced on the machined surface 11*a* of the web part 11, stress concentration at the mismatch portion can be reduced. Accordingly, the plate thickness of the web part 11 required in terms of strength is ensured without requiring manual finishing, and a machined product in which occurrence of stress concentration due to a mismatch is reduced can be provided.

Since each machining path is generated and machining is performed thereon based on a measurement result of the three-dimensional shape of the workpiece 10, the machining can be performed with high precision even when the workpiece 10 has an error with respect to a design shape (of CAD, for example).

The present disclosure is not limited to the embodiment described above, and various modifications can be implemented within a scope not departing from the spirit of the present invention. Note that it is also possible to combine respective embodiments.

The machining system and the machining apparatus, the machining method, and the machining program according to each embodiment described above are recognized as follows, for example.

A machining system (70) according to the present disclosure includes: a machining path setting unit (76) configured to generate a machining path based on a three-dimensional shape of a measured target component (10); and a movement control unit (77) configured to move an end mill (60) along the machining path. The movement control unit includes a feed direction control unit (77*a*) configured to move the end mill in a feed direction in which the end mill is moved along the machining path, an orthogonal direction control unit (77*c*) configured to move the end mill in an orthogonal direction orthogonal to the feed direction, and a tilt control unit (77*d*) configured to control a tilt angle of the end mill about an axis of the feed direction.

According to the machining system of the present disclosure, since control is performed not only on the feed direction and the orthogonal direction but also on the tilt angle of the end mill about the axis of the feed direction, the slope of a surface machined by the end mill is also controlled, and this enables higher-precision machining to be performed. For example, it is possible to improve the precision of machining performed after the target component is molded, such as additional machining or weight reduction machining.

Since each machining path is generated based on a measurement result of the three-dimensional shape of the target component to perform machining, the machining can be performed with high precision even when the target component has an error with respect to a design shape (of CAD, for example).

In the machining system according to the present disclosure, the machining path setting unit may generate a plurality of machining paths at a predetermined pitch (P) in a pitch direction orthogonal to the feed direction when a machined-by-bottom surface (web surface) is machined, the machined-by-bottom surface being a surface of the target component to be machined by a bottom surface of the end mill, and the machining path setting unit may set the tilt angle in association with each of the machining paths.

According to the machining system of the present disclosure, when the machined-by-bottom surface of the target component to be machined by the bottom surface of the end mill is machined, a plurality of machining paths are set in the pitch direction. Further, tilt angles are set for respective machining paths, and thereby the machined-by-bottom surface can be machined more flexibly with high precision.

In the machining system according to the present disclosure, when a first machining path (PP1) and a second machining path (PP2) are adjacent to each other, the machining path setting unit may set the tilt angle so that a level difference (mismatch ΔM) between a machined surface machined by the bottom surface of the end mill on the first machining path and a machined surface machined by the bottom surface of the end mill on the second machining path is less than or equal to a threshold.

According to the machining system of the present disclosure, in machining of adjacent machining paths, the tilt angles are set so that the level difference between respective machined surfaces machined by the bottom surface of the end mill is less than or equal to a threshold, and thereby, between the machining paths, the machined surface can be smooth and discontinuity can be controlled.

In the machining system according to the present disclosure, the machining path setting unit may set the predetermined pitch based on an amount of slope in the pitch direction of the machined-by-bottom surface.

According to the machining system of the present disclosure, the pitch (predetermined pitch) of the machining paths is set in accordance with the amount of slope of the machined-by-bottom surface in the pitch direction, and thereby the machining precision of the machined surface can be improved. For example, by making the pitch of machining paths wider when the amount of slope is smaller, it is possible to reduce duplication of machining and reduce the number of steps while machining the machined-by-bottom surface by using the bottom surface of the end mill. On the other hand, when the amount of slope is larger, the pitch may be made narrower to perform finer machining.

In the machining system according to the present disclosure, the machining path setting unit may generate the machining path corresponding to a machined-by-side surface (flange surface), the machined-by-side surface being a surface of the target component to be machined by a side surface of the end mill, and the machining path setting unit may set the single tilt angle as a fixed tilt angle in association with the single machined-by-side surface, and the tilt control unit may maintain the end mill at the fixed tilt angle while the end mill moves along the machining path to perform machining on the machined-by-side surface.

According to the machining system of the present disclosure, for the machined-by-side surface to be machined by the side surface of the end mill, one tilt angle (fixed tilt angle) is set for one machined-by-side surface, and the tilt angle is fixed when machining is performed on the machined-by-side surface. It is thus possible to machine the machined-by-side surface to have an even slope angle.

The machining system according to the present disclosure may include: a setting unit (71) configured to set machining target surfaces corresponding to a bottom surface and a side surface of the end mill, respectively, for the target component based on a design model of the target component; a surface model generation unit (74) configured to generate surface models corresponding to the respective machining target surfaces based on a three-dimensional measurement data of the machining target surfaces; and a component model generation unit (75) configured to combine the surface models to generate a component model, and the machining path setting unit may generate the machining path based on the component model.

According to the machining system of the present disclosure, respective surface models of the machining target surfaces corresponding to the bottom surface and the side surface of the end mill are combined to generate a component model. The machining path is then generated based on the component model, and this makes it possible to generate the machining path taking into consideration of the relationship between machining target surfaces which are machined by different edges of the end mill.

The machining system according to the present disclosure may include: a measurement path setting unit (72) configured to set a measurement path based on a design model of the target component; and a remeasurement path setting unit (78) configured to set a remeasurement path based on a three-dimensional shape of the target component measured based on the measurement path, and the machining path setting unit may generate the machining path based on the three-dimensional shape of the target component measured based on the remeasurement path.

According to the machining system of the present disclosure, a measurement path is first set based on the design model to perform measurement, and a remeasurement path is then set in accordance with the measurement result. A machining path is then generated in accordance with the measurement result using the remeasurement path. Thus, even when the target component has a shape error with respect to the design model, it is possible to accurately measure the three-dimensional shape of the target component and set the machining path through measurement in accordance with the remeasurement path. Thus, the machining precision can be improved.

The machining system according to the present disclosure may include a measuring unit configured to measure the three-dimensional shape of the target component in a state where the target component is fixed to a jig (20) so that the target component approaches a design shape.

According to the machining system of the present disclosure, measurement of the target component is performed in a state where the target component is fixed to the jig so that the target component approaches the design shape, and thereby the machining precision can be improved.

In the machining system according to the present disclosure, the measuring unit may measure the three-dimensional shape of the target component in a state where a surface to be machined by a side surface of the end mill is reformed to approach the design shape.

According to the machining system of the present disclosure, measurement is performed in a state where the surface to be machined by the side surface of the end mill is reformed to approach the design shape, and thereby the machining precision on the surface to be machined by the side surface of the end mill can be improved. Furthermore, for a surface other than the surface to be machined by the side surface of the end mill, machining can be performed taking into consideration of deformation (distortion) due to the reforming of the surface to be machined by the side surface of the end mill. The surface other than the surface to be machined by the side surface of the end mill is a surface to be machined by the bottom surface of the end mill, for example.

A machining apparatus according to the present disclosure includes: an end mill; and the machining system described above.

A machining method according to the present disclosure includes: a machining path setting step of setting a machining path based on a three-dimensional shape of a measured target component; and a movement control step of moving an end mill along the machining path. The movement control step includes a feed direction control step of moving the end mill in a feed direction in which the end mill is moved along the machining path, an orthogonal direction control step of moving the end mill in an orthogonal direction orthogonal to the feed direction, and a tilt control step of controlling a tilt angle of the end mill about an axis of the feed direction.

A machining program according to the present disclosure causes a computer to perform: a machining path setting process of setting a machining path based on a three-dimensional shape of a measured target component; and a movement control process of moving an end mill along the machining path. The movement control process includes a feed direction control process of moving the end mill in a feed direction in which the end mill is moved along the machining path, an orthogonal direction control process of moving the end mill in an orthogonal direction orthogonal to the feed direction, and a tilt control process of controlling a tilt angle of the end mill about an axis of the feed direction.

LIST OF REFERENCE SYMBOLS

10 workpiece (target component)
11 web part
11*a* machined surface
11*b* supported surface
12 upper flange part
12*a* machined surface
12*b* contacted surface
13 lower flange part
13*a* machined surface
13*b* contacted surface
14 R-part
15 R-part
16 R-part
20 jig
30 base
31 base-side step
32 bearing
33 positioning pin
40 setting block
41 supporting surface
42 upper flange contacting surface
43 lower flange contacting surface
44 lifting mechanism
50 clamp
51 clamp body
51*a* rotating part
51*b* leg part
51*c* clamp-side step
52 load bolt
53 load block
60 end mill
61 end cutting edge
62 peripheral cutting edge
70 machining system
71 setting unit
72 measurement path setting unit
73 measuring unit
74 surface model generation unit
75 component model generation unit
76 machining path setting unit
77 movement control unit
77*a* feed direction control unit
77*b* pitch direction control unit
77*c* orthogonal direction control unit
77*d* tilt control unit
78 remeasurement path setting unit
81 CPU
82 main memory
83 storage unit
84 external interface
85 communication interface
86 input unit
87 display unit
91 unmachined surface
92 ideal machined surface
93 probe
94 R-surface
95 R-surface
96 surface model
97 ball end mill
98 inverse R-cutter
99*a* inside corner R-surface
99*b* outside corner R-surface
P predetermined pitch
PP1 first machining path
PP2 second machining path
ΔE machining error
ΔM mismatch (level difference)

What is claimed is:

1. A machining method comprising:

a machining path setting step of setting a machining path based on a three-dimensional shape of a measured target component; and a movement control step of moving an end mill along the machining path, wherein the movement control step includes a feed direction control step of moving the end mill in a feed direction in which the end mill is moved along the machining path, an orthogonal direction control step of moving the end mill in an orthogonal direction orthogonal to the feed direction, and a tilt control step of controlling a tilt angle of the end mill about an axis of the feed direction, wherein the machining path setting step includes setting a plurality of machining paths at a predetermined pitch in a pitch direction orthogonal to the feed direction when a machined-by-bottom surface is machined, the machined-by-bottom surface being a surface of the target component to be machined by a bottom surface of the end mill, setting the tilt angle in association with each of the machining paths, and when a first machining path and a second machining path are adjacent to each other, setting the tilt angle so that a level difference between a machining surface machined by the bottom surface of the end mill on the first machining path and a machining surface machined by the bottom surface of the end mill on the second machining path is less than or equal to a threshold.

2. A non-transitory tangible computer readable storage medium storing a program configured to cause a computer to perform:

a machining path setting process of setting a machining path based on a three-dimensional shape of a measured target component; and a movement control process of moving an end mill along the machining path, wherein the movement control process includes a feed direction control process of moving the end mill in a feed direction in which the end mill is moved along the machining path, an orthogonal direction control process of moving the end mill in an orthogonal direction orthogonal to the feed direction, and a tilt control process of controlling a tilt angle of the end mill about an axis of the feed direction, wherein the machining path setting process includes setting a plurality of machining paths at a predetermined pitch in a pitch direction orthogonal to the feed direction when a machined-by-bottom surface is machined, the machined-by-bottom surface being a surface of the target component to be machined by a bottom surface of the end mill, setting the tilt angle in association with each of the machining paths, and when a first machining path and a second machining path are adjacent to each other, setting the tilt angle so that a level difference between a machining surface machined by the bottom surface of the end mill on the first machining path and a machining surface machined by the bottom surface of the end mill on the second machining path is less than or equal to a threshold.

* * * * *